US008686269B2

(12) United States Patent
Schmidt et al.

(10) Patent No.: US 8,686,269 B2
(45) **Date of Patent: *Apr. 1, 2014**

(54) PROVIDING REALISTIC INTERACTION TO A PLAYER OF A MUSIC-BASED VIDEO GAME

(75) Inventors: Daniel A. Schmidt, Somerville, MA (US); Gregory B. LoPiccolo, Brookline, MA (US); Eran Egozy, Brookline, MA (US)

(73) Assignee: Harmonix Music Systems, Inc., Cambridge, MA (US)

( * ) Notice: Subject to any disclaimer, the term of this patent is extended or adjusted under 35 U.S.C. 154(b) by 823 days.

This patent is subject to a terminal disclaimer.

(21) Appl. No.: 12/263,434

(22) Filed: Oct. 31, 2008

(65) Prior Publication Data

US 2009/0082078 A1 Mar. 26, 2009

Related U.S. Application Data

(63) Continuation of application No. 11/683,136, filed on Mar. 7, 2007, now Pat. No. 7,459,624.

(60) Provisional application No. 60/743,938, filed on Mar. 29, 2006.

(51) Int. Cl.

| | |
|---|---|
| ***G09B 15/00*** | (2006.01) |
| ***G09B 15/02*** | (2006.01) |
| ***G10H 1/00*** | (2006.01) |

(52) U.S. Cl.
USPC ............. 84/477 R; 84/478; 84/485 R; 84/600

(58) Field of Classification Search
None
See application file for complete search history.

(56) References Cited

U.S. PATENT DOCUMENTS

| | | | |
|---|---|---|---|
| D211,666 | S | 7/1968 | MacGillavry |
| 3,430,530 | A | 3/1969 | Grindinger |
| 3,897,711 | A | 8/1975 | Elledge |
| D245,038 | S | 7/1977 | Ebata et al. |
| D247,795 | S | 4/1978 | Darrell |
| 4,128,037 | A | 12/1978 | Montemurro |
| D259,785 | S | 7/1981 | Kushida et al. |
| 4,295,406 | A | 10/1981 | Smith |
| D262,017 | S | 11/1981 | Frakes, Jr. |
| D265,821 | S | 8/1982 | Okada et al. |
| D266,664 | S | 10/1982 | Hoshino et al. |

(Continued)

FOREIGN PATENT DOCUMENTS

| | | |
|---|---|---|
| AT | 468071 T | 6/2010 |
| AU | 741239 B2 | 4/1999 |

(Continued)

OTHER PUBLICATIONS

Guitar Hero (video game)—Wikipedia, the free encyclopedia—(Publisher—RedOctane) Release Date Nov. 2005.*

(Continued)

*Primary Examiner* — Marlon Fletcher
(74) *Attorney, Agent, or Firm* — Wilmer Cutler Pickering Hale and Dorr LLP

(57) ABSTRACT

A simulated musical instrument may be used to alter the audio of a video game, the video aspects of video game, or both. Use of a controller simulating a musical instrument allows a rhythm-action game can be enjoyed in a manner closer to a realistic state of playing an instrument.

58 Claims, 10 Drawing Sheets

(56) References Cited

U.S. PATENT DOCUMENTS

| | | | | |
|---|---|---|---|---|
| D287,521 | S | 12/1986 | Obara | |
| 4,644,495 | A | 2/1987 | Crane | |
| 4,766,541 | A | 8/1988 | Bleich et al. | |
| 4,783,812 | A | 11/1988 | Kaneoka | |
| 4,794,838 | A | 1/1989 | Corrigau, III | |
| 4,843,568 | A | 6/1989 | Krueger et al. | |
| 4,890,833 | A | 1/1990 | Lantz et al. | |
| D310,668 | S | 9/1990 | Takada | |
| 5,074,182 | A | 12/1991 | Capps et al. | |
| 5,107,743 | A | 4/1992 | Decker | |
| 5,109,482 | A | 4/1992 | Bohrman | |
| 5,140,889 | A | 8/1992 | Segan et al. | |
| 5,194,683 | A | 3/1993 | Tsumura et al. | |
| 5,208,413 | A | 5/1993 | Tsumura et al. | |
| 5,250,745 | A | 10/1993 | Tsumura | |
| 5,262,765 | A | 11/1993 | Tsumura et al. | |
| 5,287,789 | A | 2/1994 | Zimmerman | |
| D345,554 | S | 3/1994 | Dones | |
| 5,362,049 | A | 11/1994 | Hofer | |
| 5,368,309 | A | 11/1994 | Monroe et al. | |
| 5,393,926 | A | 2/1995 | Johnson | |
| 5,395,123 | A | 3/1995 | Kondo | |
| 5,398,585 | A | 3/1995 | Starr | |
| 5,399,799 | A | 3/1995 | Gabriel | |
| 5,434,949 | A | 7/1995 | Jeong | |
| 5,453,570 | A | 9/1995 | Umeda et al. | |
| 5,482,087 | A | 1/1996 | Overbergh et al. | |
| 5,488,196 | A | 1/1996 | Zimmerman et al. | |
| 5,491,297 | A | 2/1996 | Johnson et al. | |
| 5,510,573 | A | 4/1996 | Cho et al. | |
| 5,524,637 | A | 6/1996 | Erickson | |
| 5,534,917 | A | 7/1996 | MacDougall | |
| 5,537,528 | A | 7/1996 | Takahashi et al. | |
| 5,553,864 | A | 9/1996 | Sitrick | |
| 5,557,056 | A | 9/1996 | Hong et al. | |
| 5,557,057 | A * | 9/1996 | Starr | 84/617 |
| 5,563,358 | A | 10/1996 | Zimmerman | |
| 5,565,639 | A | 10/1996 | Bae | |
| 5,567,162 | A | 10/1996 | Park | |
| 5,574,238 | A | 11/1996 | Mencher | |
| 5,613,909 | A | 3/1997 | Stelovsky | |
| 5,616,078 | A | 4/1997 | Oh | |
| 5,631,433 | A | 5/1997 | Iida et al. | |
| 5,634,849 | A | 6/1997 | Abecassis | |
| 5,663,517 | A | 9/1997 | Oppenheim | |
| 5,670,729 | A | 9/1997 | Miller et al. | |
| 5,681,223 | A | 10/1997 | Weinreich | |
| 5,693,903 | A | 12/1997 | Heidorn et al. | |
| D389,216 | S | 1/1998 | Isetani et al. | |
| 5,715,179 | A | 2/1998 | Park | |
| 5,719,344 | A | 2/1998 | Pawate | |
| 5,723,802 | A | 3/1998 | Johnson et al. | |
| 5,739,457 | A | 4/1998 | Devecka | |
| 5,768,396 | A | 6/1998 | Sone | |
| 5,777,251 | A * | 7/1998 | Hotta et al. | 84/609 |
| 5,782,692 | A | 7/1998 | Stelovsky | |
| D398,916 | S | 9/1998 | Bernardi | |
| 5,804,752 | A | 9/1998 | Sone et al. | |
| D399,887 | S | 10/1998 | Schultz et al. | |
| D400,196 | S | 10/1998 | Cameron et al. | |
| 5,824,933 | A | 10/1998 | Gabriel | |
| 5,830,065 | A | 11/1998 | Sitrick | |
| D403,024 | S | 12/1998 | Muraki et al. | |
| 5,874,686 | A | 2/1999 | Ghias et al. | |
| 5,889,224 | A | 3/1999 | Tanaka | |
| 5,906,494 | A | 5/1999 | Ogawa et al. | |
| D411,258 | S | 6/1999 | Isetani et al. | |
| 5,913,727 | A | 6/1999 | Ahdoot | |
| 5,915,288 | A | 6/1999 | Gabriel | |
| 5,915,972 | A | 6/1999 | Tada | |
| 5,915,975 | A | 6/1999 | McGrath | |
| 5,925,843 | A | 7/1999 | Miller et al. | |
| 5,983,280 | A | 11/1999 | Hunt | |
| 5,990,405 | A | 11/1999 | Auten et al. | |
| 6,001,013 | A | 12/1999 | Ota | |
| 6,009,457 | A | 12/1999 | Moller | |
| 6,018,121 | A | 1/2000 | Devecka | |
| 6,066,792 | A | 5/2000 | Sone | |
| 6,067,566 | A | 5/2000 | Moline | |
| 6,072,113 | A | 6/2000 | Tohgi et al. | |
| 6,073,489 | A | 6/2000 | French et al. | |
| 6,075,197 | A | 6/2000 | Chan | |
| 6,091,408 | A | 7/2000 | Treibitz et al. | |
| 6,098,458 | A | 8/2000 | French et al. | |
| 6,121,531 | A | 9/2000 | Kato | |
| 6,142,870 | A | 11/2000 | Wada et al. | |
| 6,162,981 | A | 12/2000 | Newcomer et al. | |
| 6,166,314 | A | 12/2000 | Weinstock et al. | |
| 6,177,623 | B1 | 1/2001 | Ooseki | |
| 6,182,044 | B1 | 1/2001 | Fong et al. | |
| 6,184,899 | B1 | 2/2001 | Akemann | |
| 6,191,350 | B1 | 2/2001 | Okulov et al. | |
| 6,215,411 | B1 | 4/2001 | Gothard | |
| 6,224,486 | B1 | 5/2001 | Walker et al. | |
| 6,225,547 | B1 * | 5/2001 | Toyama et al. | 84/611 |
| 6,227,968 | B1 | 5/2001 | Suzuki et al. | |
| 6,227,974 | B1 | 5/2001 | Eilat et al. | |
| 6,252,153 | B1 | 6/2001 | Toyama | |
| 6,263,392 | B1 | 7/2001 | McCauley | |
| 6,268,557 | B1 | 7/2001 | Devecka | |
| 6,287,198 | B1 | 9/2001 | McCauley | |
| 6,288,727 | B1 | 9/2001 | Akemann | |
| 6,308,565 | B1 | 10/2001 | French et al. | |
| 6,309,301 | B1 | 10/2001 | Sano | |
| 6,319,129 | B1 | 11/2001 | Igarashi et al. | |
| 6,319,130 | B1 | 11/2001 | Ooseki et al. | |
| 6,320,110 | B1 | 11/2001 | Ishikawa et al. | |
| 6,326,536 | B1 | 12/2001 | Wang | |
| 6,329,620 | B1 | 12/2001 | Oishi et al. | |
| 6,337,433 | B1 | 1/2002 | Nishimoto | |
| 6,342,665 | B1 | 1/2002 | Okita et al. | |
| 6,347,998 | B1 | 2/2002 | Yoshitomi et al. | |
| 6,350,942 | B1 | 2/2002 | Thomson | |
| 6,352,432 | B1 | 3/2002 | Tsai et al. | |
| 6,353,174 | B1 | 3/2002 | Schmidt et al. | |
| D455,792 | S | 4/2002 | Isetani et al. | |
| 6,369,313 | B2 | 4/2002 | Devecka | |
| 6,379,244 | B1 | 4/2002 | Sagawa et al. | |
| 6,380,474 | B2 | 4/2002 | Taruguchi et al. | |
| 6,384,736 | B1 | 5/2002 | Gothard | |
| 6,390,923 | B1 | 5/2002 | Yoshitomi et al. | |
| 6,407,324 | B1 | 6/2002 | Hulcher | |
| 6,410,835 | B2 | 6/2002 | Suzuki et al. | |
| 6,417,432 | B1 | 7/2002 | Downing | |
| 6,425,822 | B1 | 7/2002 | Hayashida et al. | |
| 6,425,825 | B1 | 7/2002 | Sitrick | |
| 6,425,827 | B1 | 7/2002 | Nimura | |
| 6,425,828 | B2 | 7/2002 | Walker et al. | |
| 6,429,863 | B1 | 8/2002 | LoPiccolo et al. | |
| 6,430,997 | B1 | 8/2002 | French et al. | |
| 6,437,227 | B1 | 8/2002 | Theimer | |
| 6,438,611 | B1 | 8/2002 | Hara et al. | |
| D462,698 | S | 9/2002 | Sturm | |
| 6,444,887 | B1 | 9/2002 | Hiraoka et al. | |
| 6,450,886 | B1 | 9/2002 | Oishi et al. | |
| 6,450,888 | B1 | 9/2002 | Takase et al. | |
| 6,461,239 | B1 | 10/2002 | Sagawa et al. | |
| 6,464,585 | B1 | 10/2002 | Miyamoto et al. | |
| 6,468,161 | B1 | 10/2002 | Shimomura | |
| 6,471,584 | B1 | 10/2002 | Wada et al. | |
| 6,482,087 | B1 | 11/2002 | Egozy et al. | |
| 6,483,018 | B2 * | 11/2002 | Mead | 84/477 R |
| 6,504,089 | B1 | 1/2003 | Negishi et al. | |
| 6,506,969 | B1 | 1/2003 | Baron | |
| 6,514,083 | B1 | 2/2003 | Kumar et al. | |
| 6,527,639 | B2 | 3/2003 | Suzuki | |
| 6,530,834 | B2 | 3/2003 | Kondo | |
| 6,530,839 | B2 | 3/2003 | Horio | |
| 6,535,269 | B2 | 3/2003 | Sherman et al. | |
| 6,540,613 | B2 | 4/2003 | Okubo et al. | |
| 6,541,692 | B2 | 4/2003 | Miller | |
| 6,542,155 | B1 | 4/2003 | Mifune et al. | |
| 6,542,168 | B2 | 4/2003 | Negishi et al. | |
| 6,544,119 | B2 | 4/2003 | Kubo et al. | |

(56) References Cited

U.S. PATENT DOCUMENTS

| | | | | | |
|---|---|---|---|---|---|
| 6,544,122 | B2 | | 4/2003 | Araki et al. | |
| 6,544,125 | B2 | | 4/2003 | Horigami et al. | |
| 6,554,706 | B2 | | 4/2003 | Kim et al. | |
| 6,554,711 | B1 | | 4/2003 | Kawasaki et al. | |
| 6,555,737 | B2 | | 4/2003 | Miyaki et al. | |
| 6,570,078 | B2 | | 5/2003 | Ludwig | |
| 6,577,330 | B1 | | 6/2003 | Tsuda et al. | |
| 6,582,235 | B1 | | 6/2003 | Tsai et al. | |
| 6,582,309 | B2 | | 6/2003 | Higurashi et al. | |
| 6,589,120 | B1 | | 7/2003 | Takahashi | |
| 6,598,074 | B1 | | 7/2003 | Moller et al. | |
| 6,599,195 | B1 | | 7/2003 | Araki et al. | |
| 6,607,446 | B1 | | 8/2003 | Shimomura et al. | |
| 6,609,979 | B1 | | 8/2003 | Wada | |
| 6,612,931 | B2 | | 9/2003 | Kojima et al. | |
| 6,613,100 | B2 | | 9/2003 | Miller | |
| 6,618,053 | B1 | | 9/2003 | Tanner | |
| 6,623,358 | B2 | | 9/2003 | Harima | |
| 6,629,892 | B2 | | 10/2003 | Oe et al. | |
| 6,634,886 | B2 | | 10/2003 | Oyama et al. | |
| 6,636,877 | B1 | | 10/2003 | Doleac et al. | |
| 6,638,160 | B2 | | 10/2003 | Yoshitomi | |
| 6,645,067 | B1 | | 11/2003 | Okita et al. | |
| 6,645,076 | B1 | | 11/2003 | Sugai | |
| 6,645,784 | B2 | | 11/2003 | Tayebati et al. | |
| 6,653,545 | B2 | | 11/2003 | Redmann et al. | |
| 6,659,873 | B1 | | 12/2003 | Kitano et al. | |
| 6,663,491 | B2 | | 12/2003 | Watabe et al. | |
| 6,666,764 | B1 | | 12/2003 | Kudo | |
| 6,669,563 | B1 | | 12/2003 | Kitami et al. | |
| 6,676,523 | B1 | | 1/2004 | Kasai et al. | |
| 6,682,424 | B2 | | 1/2004 | Yamauchi et al. | |
| 6,684,480 | B2 | | 2/2004 | Conrad | |
| 6,685,480 | B2 | | 2/2004 | Nishimoto et al. | |
| 6,695,694 | B2 | | 2/2004 | Ishikawa et al. | |
| 6,712,692 | B2 | | 3/2004 | Basson et al. | |
| 6,725,108 | B1 | | 4/2004 | Hall | |
| 6,727,889 | B2 | | 4/2004 | Shaw | |
| 6,733,382 | B2 | | 5/2004 | Oe et al. | |
| 6,738,052 | B1 | | 5/2004 | Manke et al. | |
| 6,740,802 | B1 | | 5/2004 | Browne, Jr. | |
| 6,740,803 | B2 | | 5/2004 | Brinkman et al. | |
| 6,743,099 | B2 | | 6/2004 | Yabe et al. | |
| 6,749,432 | B2 | | 6/2004 | French et al. | |
| 6,749,508 | B2 | | 6/2004 | Kohira et al. | |
| 6,758,753 | B1 | | 7/2004 | Nagata et al. | |
| 6,758,756 | B1 | | 7/2004 | Horigami et al. | |
| 6,764,399 | B2 | | 7/2004 | Nagata et al. | |
| 6,765,590 | B1 | | 7/2004 | Watahiki et al. | |
| 6,765,726 | B2 | | 7/2004 | French et al. | |
| 6,767,282 | B2 | | 7/2004 | Matsuyama et al. | |
| 6,769,689 | B1 | | 8/2004 | Shimomura et al. | |
| 6,786,821 | B2 | | 9/2004 | Nobe et al. | |
| 6,811,491 | B1 | | 11/2004 | Levenberg et al. | |
| 6,821,203 | B2 | | 11/2004 | Suga et al. | |
| 6,831,220 | B2 | | 12/2004 | Varme | |
| 6,831,656 | B2 | | 12/2004 | Kitao | |
| 6,835,136 | B2 | | 12/2004 | Kitao | |
| 6,835,887 | B2 | | 12/2004 | Devecka | |
| 6,838,608 | B2 | | 1/2005 | Koike | |
| 6,843,726 | B1 | | 1/2005 | Nomi et al. | |
| 6,850,252 | B1 | | 2/2005 | Hoffberg | |
| 6,852,034 | B2 | | 2/2005 | Nagata et al. | |
| 6,856,923 | B2 | | 2/2005 | Jung | |
| 6,857,960 | B2 | | 2/2005 | Okubo et al. | |
| D503,407 | S | | 3/2005 | Kaku | |
| 6,876,496 | B2 | | 4/2005 | French et al. | |
| 6,881,148 | B2 | | 4/2005 | Yotsugi et al. | |
| 6,881,887 | B2 | | 4/2005 | Berens | |
| 6,890,262 | B2 | | 5/2005 | Oishi et al. | |
| 6,893,343 | B2 | | 5/2005 | Suda et al. | |
| 6,894,693 | B1 | | 5/2005 | Nash | |
| 6,898,637 | B2 | | 5/2005 | Curtin | |
| 6,905,413 | B1 | | 6/2005 | Terao et al. | |
| 6,915,488 | B2 | | 7/2005 | Omori et al. | |
| 6,921,332 | B2 | | 7/2005 | Fukunaga et al. | |
| 6,924,425 | B2 | | 8/2005 | Naples et al. | |
| 6,930,235 | B2 | | 8/2005 | Sandborn et al. | |
| 6,930,236 | B2 | | 8/2005 | Jung | |
| 6,936,758 | B2 | | 8/2005 | Itoh | |
| 6,949,023 | B1 | | 9/2005 | Okubo et al. | |
| 6,953,887 | B2 | | 10/2005 | Nagashima et al. | |
| 6,964,610 | B2 | | 11/2005 | Yamauchi et al. | |
| 6,967,275 | B2 | | 11/2005 | Ozick | |
| 6,976,918 | B2 | | 12/2005 | Hosokawa | |
| 6,991,542 | B2 | | 1/2006 | Asami et al. | |
| 6,995,765 | B2 | | 2/2006 | Boudier | |
| 6,995,869 | B2 | | 2/2006 | Onodera | |
| 7,000,200 | B1 | | 2/2006 | Martins | |
| 7,001,272 | B2 | | 2/2006 | Yamashita et al. | |
| D519,569 | S | | 4/2006 | Kiyono et al. | |
| 7,022,905 | B1 | | 4/2006 | Hinman et al. | |
| 7,027,046 | B2 | | 4/2006 | Zhang | |
| 7,030,307 | B2 | | 4/2006 | Wedel | |
| 7,030,311 | B2 | | 4/2006 | Brinkman et al. | |
| 7,037,197 | B2 | | 5/2006 | Watanabe | |
| 7,038,855 | B2 | | 5/2006 | French et al. | |
| 7,044,856 | B2 | | 5/2006 | Suzuki | |
| 7,044,857 | B1 | | 5/2006 | Klitsner et al. | |
| 7,064,672 | B2 | | 6/2006 | Gothard | |
| 7,066,818 | B2 | | 6/2006 | Ikeda | |
| 7,069,296 | B2 | | 6/2006 | Moller et al. | |
| 7,070,500 | B1 | | 7/2006 | Nomi et al. | |
| 7,074,999 | B2 | | 7/2006 | Sitrick et al. | |
| 7,084,888 | B2 | | 8/2006 | Takahama et al. | |
| 7,098,392 | B2 | | 8/2006 | Sitrick et al. | |
| 7,098,921 | B2 | | 8/2006 | Nash et al. | |
| 7,103,873 | B2 | | 9/2006 | Tanner et al. | |
| 7,122,751 | B1 | | 10/2006 | Anderson et al. | |
| 7,123,272 | B2 | | 10/2006 | Moriyama | |
| 7,128,649 | B2 | | 10/2006 | Nobe et al. | |
| 7,129,408 | B2 | | 10/2006 | Uehara | |
| 7,134,876 | B2 | | 11/2006 | Hou | |
| 7,145,070 | B2 | | 12/2006 | Barry | |
| D535,659 | S | | 1/2007 | Hally et al. | |
| 7,164,075 | B2 | | 1/2007 | Tada | |
| 7,164,076 | B2 | | 1/2007 | McHale et al. | |
| 7,169,998 | B2 | | 1/2007 | Kondo et al. | |
| 7,170,510 | B2 | | 1/2007 | Kawahara et al. | |
| 7,174,510 | B2 | | 2/2007 | Salter | |
| 7,189,912 | B2 | | 3/2007 | Jung | |
| 7,192,353 | B2 | | 3/2007 | Okubo | |
| 7,199,298 | B2 | | 4/2007 | Funaki | |
| 7,199,801 | B2 | | 4/2007 | Tsunashima et al. | |
| 7,201,659 | B2 | | 4/2007 | Nakayama et al. | |
| 7,223,913 | B2 | | 5/2007 | Knapp et al. | |
| 7,259,357 | B2 | | 8/2007 | Walker | |
| 7,259,971 | B1 | | 8/2007 | Allen et al. | |
| 7,263,668 | B1 | | 8/2007 | Lentz | |
| 7,271,329 | B2 | | 9/2007 | Franzblau | |
| 7,274,803 | B1 | | 9/2007 | Sharma et al. | |
| 7,304,232 | B1 | | 12/2007 | Nicholes | |
| 7,317,812 | B1 | | 1/2008 | Krahnstoever et al. | |
| 7,320,643 | B1 | * | 1/2008 | Brosius et al. | 463/37 |
| 7,323,631 | B2 | | 1/2008 | Miyaki et al. | |
| 7,359,121 | B2 | | 4/2008 | French et al. | |
| D568,659 | S | | 5/2008 | Ophardt et al. | |
| D568,892 | S | | 5/2008 | Stabb et al. | |
| D569,382 | S | * | 5/2008 | Yow et al. | D14/455 |
| 7,367,887 | B2 | | 5/2008 | Watabe et al. | |
| D572,265 | S | | 7/2008 | Guimaraes et al. | |
| 7,423,213 | B2 | | 9/2008 | Sitrick | |
| 7,435,178 | B1 | | 10/2008 | Tam et al. | |
| 7,453,035 | B1 | | 11/2008 | Evans et al. | |
| 7,459,324 | B1 | | 12/2008 | Ptasinski et al. | |
| 7,459,624 | B2 | * | 12/2008 | Schmidt et al. | 84/477 R |
| 7,462,772 | B2 | | 12/2008 | Salter | |
| 7,480,873 | B2 | | 1/2009 | Kawahara | |
| 7,488,886 | B2 | | 2/2009 | Kemp | |
| D590,407 | S | | 4/2009 | Watanabe et al. | |
| 7,521,619 | B2 | | 4/2009 | Salter | |
| 7,528,315 | B2 | | 5/2009 | Goodwin | |
| 7,536,654 | B2 | | 5/2009 | Anthony et al. | |
| 7,559,834 | B1 | | 7/2009 | York | |

(56) References Cited

U.S. PATENT DOCUMENTS

| | | | | |
|---|---|---|---|---|
| 7,579,543 | B2 | 8/2009 | Haruyama et al. | |
| D599,812 | S | 9/2009 | Hirsch | |
| D599,819 | S | 9/2009 | Lew | |
| 7,582,015 | B2 | 9/2009 | Onoda et al. | |
| 7,589,727 | B2 | 9/2009 | Haeker | |
| 7,605,322 | B2 | 10/2009 | Nakamura | |
| 7,612,278 | B2 | 11/2009 | Sitrick et al. | |
| 7,625,284 | B2 | 12/2009 | Kay et al. | |
| 7,628,699 | B2 | 12/2009 | Onoda et al. | |
| D607,892 | S | 1/2010 | Murchie et al. | |
| 7,649,134 | B2 | 1/2010 | Kashioka | |
| D609,715 | S | 2/2010 | Chaudhri | |
| 7,722,450 | B2 | 5/2010 | Onoda et al. | |
| 7,747,348 | B2 | 6/2010 | Shim et al. | |
| D619,598 | S | 7/2010 | Maitlen et al. | |
| D619,609 | S | 7/2010 | Meziere | |
| 7,754,961 | B1 | 7/2010 | Yang et al. | |
| 7,758,427 | B2 | 7/2010 | Egozy | |
| 7,772,480 | B2 | 8/2010 | Brennan | |
| 7,789,741 | B1 | 9/2010 | Fields et al. | |
| 7,791,808 | B2 | 9/2010 | French et al. | |
| 7,797,641 | B2 | 9/2010 | Karukka et al. | |
| D624,932 | S | 10/2010 | Chaudhri | |
| 7,806,759 | B2 | 10/2010 | McHale et al. | |
| 7,814,436 | B2 | 10/2010 | Schrag et al. | |
| 7,823,070 | B2 | 10/2010 | Nelson et al. | |
| 7,829,777 | B2 | 11/2010 | Kyuma et al. | |
| 7,838,755 | B2 | 11/2010 | Taub et al. | |
| 7,840,288 | B2 | 11/2010 | Graepel | |
| 7,840,907 | B2 | 11/2010 | Kikuchi et al. | |
| D628,582 | S | 12/2010 | Kurozumi et al. | |
| 7,853,896 | B2 | 12/2010 | Ok et al. | |
| 7,853,897 | B2 | 12/2010 | Ogawa et al. | |
| 7,865,834 | B1 | 1/2011 | van Os et al. | |
| 7,893,337 | B2 | 2/2011 | Lenz | |
| 7,935,880 | B2 | 5/2011 | Stoddard et al. | |
| 7,980,997 | B2 | 7/2011 | Thukral et al. | |
| 7,982,114 | B2 | 7/2011 | Applewhite et al. | |
| 8,026,435 | B2 | 9/2011 | Stoddard et al. | |
| 8,057,290 | B2 | 11/2011 | Vance et al. | |
| D650,802 | S | 12/2011 | Jang et al. | |
| 8,076,574 | B2 | 12/2011 | Irmer et al. | |
| D651,608 | S | 1/2012 | Allen et al. | |
| D651,609 | S | 1/2012 | Pearson et al. | |
| 8,176,439 | B2 | 5/2012 | Kamen et al. | |
| 8,198,526 | B2 | 6/2012 | Izen et al. | |
| 8,202,161 | B2 | 6/2012 | Leake et al. | |
| 8,205,172 | B2 | 6/2012 | Wong et al. | |
| 8,209,606 | B2 | 6/2012 | Ording | |
| 8,225,227 | B2 | 7/2012 | Headrick et al. | |
| 8,230,360 | B2 | 7/2012 | Ma et al. | |
| D664,975 | S | 8/2012 | Arnold | |
| 2001/0004861 | A1 | 6/2001 | Suzuki et al. | |
| 2001/0007824 | A1 | 7/2001 | Fukuda | |
| 2001/0007829 | A1 | 7/2001 | Suzuki | |
| 2001/0008844 | A1 | 7/2001 | Yamauchi et al. | |
| 2001/0008846 | A1 | 7/2001 | Yamauchi et al. | |
| 2001/0012795 | A1 | 8/2001 | Asami et al. | |
| 2001/0014440 | A1 | 8/2001 | Oyama et al. | |
| 2001/0014620 | A1 | 8/2001 | Nobe et al. | |
| 2001/0014621 | A1 | 8/2001 | Okubo et al. | |
| 2001/0016510 | A1 | 8/2001 | Ishikawa et al. | |
| 2001/0023202 | A1 | 9/2001 | Okubo | |
| 2001/0024972 | A1 | 9/2001 | Kitao | |
| 2001/0030652 | A1 | 10/2001 | Kitao | |
| 2001/0031653 | A1 | 10/2001 | Oe et al. | |
| 2001/0033287 | A1 | 10/2001 | Naegle et al. | |
| 2001/0035868 | A1 | 11/2001 | Uehara et al. | |
| 2001/0036861 | A1 | 11/2001 | Uehara et al. | |
| 2001/0037181 | A1 | 11/2001 | Matsuura et al. | |
| 2001/0039207 | A1 | 11/2001 | Horigami et al. | |
| 2001/0041615 | A1 | 11/2001 | Kondo | |
| 2002/0002411 | A1 | 1/2002 | Higurashi et al. | |
| 2002/0002900 | A1 | 1/2002 | Cho | |
| 2002/0004420 | A1 | 1/2002 | Suga et al. | |
| 2002/0005109 | A1 | 1/2002 | Miller | |
| 2002/0006819 | A1 | 1/2002 | Kubo et al. | |
| 2002/0006823 | A1 | 1/2002 | Horio | |
| 2002/0013166 | A1 | 1/2002 | Yoshitomi | |
| 2002/0016203 | A1 | 2/2002 | Nagata et al. | |
| 2002/0019258 | A1 | 2/2002 | Kim et al. | |
| 2002/0022520 | A1 | 2/2002 | Oe et al. | |
| 2002/0022522 | A1 | 2/2002 | Yamada | |
| 2002/0025841 | A1 | 2/2002 | Nobe et al. | |
| 2002/0025842 | A1 | 2/2002 | Nobe et al. | |
| 2002/0025853 | A1 | 2/2002 | Kojima et al. | |
| 2002/0027899 | A1 | 3/2002 | Ikeda | |
| 2002/0032054 | A1 | 3/2002 | Hosoya | |
| 2002/0041385 | A1 | 4/2002 | Onodera | |
| 2002/0052236 | A1 | 5/2002 | Kohira et al. | |
| 2002/0054127 | A1 | 5/2002 | Omori et al. | |
| 2002/0055383 | A1 | 5/2002 | Onda et al. | |
| 2002/0055386 | A1 | 5/2002 | Yotsugi et al. | |
| 2002/0061776 | A1 | 5/2002 | Wada et al. | |
| 2002/0065121 | A1 | 5/2002 | Fukunaga et al. | |
| 2002/0085833 | A1 | 7/2002 | Miyauchi | |
| 2002/0091455 | A1 | 7/2002 | Williams | |
| 2002/0091847 | A1 | 7/2002 | Curtin | |
| 2002/0094865 | A1 | 7/2002 | Araki et al. | |
| 2002/0094866 | A1 | 7/2002 | Takeda et al. | |
| 2002/0105229 | A1 | 8/2002 | Tanaka | |
| 2002/0119811 | A1 | 8/2002 | Yabe et al. | |
| 2002/0128736 | A1 * | 9/2002 | Yoshida et al. | 700/92 |
| 2002/0142818 | A1 | 10/2002 | Nakatsuka et al. | |
| 2002/0142824 | A1 | 10/2002 | Kazaoka et al. | |
| 2002/0142827 | A1 | 10/2002 | Aida et al. | |
| 2002/0142834 | A1 | 10/2002 | Sobue | |
| 2002/0151337 | A1 | 10/2002 | Yamashita et al. | |
| 2002/0160824 | A1 | 10/2002 | Goto et al. | |
| 2002/0169014 | A1 | 11/2002 | Egozy et al. | |
| 2002/0187835 | A1 | 12/2002 | Nakayama et al. | |
| 2002/0198045 | A1 | 12/2002 | Okubo | |
| 2003/0000364 | A1 | 1/2003 | Deverich | |
| 2003/0003991 | A1 | 1/2003 | Kuraishi | |
| 2003/0003992 | A1 | 1/2003 | Furuya | |
| 2003/0011620 | A1 | 1/2003 | Moriyama | |
| 2003/0014262 | A1 | 1/2003 | Kim | |
| 2003/0017872 | A1 | 1/2003 | Oishi et al. | |
| 2003/0028598 | A1 | 2/2003 | Moller et al. | |
| 2003/0032478 | A1 | 2/2003 | Takahama et al. | |
| 2003/0045334 | A1 | 3/2003 | Hosokawa | |
| 2003/0069071 | A1 | 4/2003 | Britt et al. | |
| 2003/0070159 | A1 | 4/2003 | Webb | |
| 2003/0078086 | A1 | 4/2003 | Matsuyama et al. | |
| 2003/0078102 | A1 | 4/2003 | Okita et al. | |
| 2003/0104868 | A1 | 6/2003 | Okita et al. | |
| 2003/0109298 | A1 | 6/2003 | Oishi et al. | |
| 2003/0151628 | A1 | 8/2003 | Salter | |
| 2003/0164084 | A1 | 9/2003 | Redmann et al. | |
| 2003/0195041 | A1 | 10/2003 | McCauley | |
| 2003/0199317 | A1 | 10/2003 | McCauley | |
| 2003/0214498 | A1 | 11/2003 | Gothard | |
| 2003/0232644 | A1 | 12/2003 | Takahashi et al. | |
| 2003/0232645 | A1 | 12/2003 | Suda et al. | |
| 2004/0012540 | A1 | 1/2004 | Treibitz et al. | |
| 2004/0054725 | A1 | 3/2004 | Moller et al. | |
| 2004/0063479 | A1 | 4/2004 | Kimura | |
| 2004/0072620 | A1 | 4/2004 | Nagata et al. | |
| 2004/0077405 | A1 | 4/2004 | Watanabe | |
| 2004/0082380 | A1 | 4/2004 | George et al. | |
| 2004/0082386 | A1 | 4/2004 | George et al. | |
| 2004/0089139 | A1 | 5/2004 | Georges et al. | |
| 2004/0092303 | A1 | 5/2004 | George et al. | |
| 2004/0092304 | A1 | 5/2004 | George et al. | |
| 2004/0092305 | A1 | 5/2004 | George et al. | |
| 2004/0092306 | A1 | 5/2004 | George et al. | |
| 2004/0092307 | A1 | 5/2004 | George et al. | |
| 2004/0092313 | A1 | 5/2004 | Saito et al. | |
| 2004/0092314 | A1 | 5/2004 | George et al. | |
| 2004/0093354 | A1 | 5/2004 | Xu et al. | |
| 2004/0098582 | A1 | 5/2004 | Mori | |
| 2004/0109000 | A1 | 6/2004 | Chosokabe | |
| 2004/0113360 | A1 | 6/2004 | George et al. | |
| 2004/0116184 | A1 | 6/2004 | George et al. | |

(56) References Cited

U.S. PATENT DOCUMENTS

2004/0116185 A1 6/2004 George et al.
2004/0123726 A1 7/2004 Kato et al.
2004/0127282 A1 7/2004 Naobayashi
2004/0127291 A1 7/2004 George et al.
2004/0132518 A1 7/2004 Uehara et al.
2004/0132531 A1 7/2004 George et al.
2004/0137984 A1 7/2004 Salter
2004/0152514 A1 8/2004 Kasai et al.
2004/0154460 A1 8/2004 Virolainen et al.
2004/0181592 A1 9/2004 Samra et al.
2004/0186720 A1 9/2004 Kemmochi
2004/0204211 A1 10/2004 Suzuki
2004/0204238 A1 10/2004 Aoki
2004/0205204 A1 10/2004 Chafe
2004/0207774 A1 10/2004 Gothard
2004/0209673 A1 10/2004 Shiraishi
2004/0229685 A1 11/2004 Smith et al.
2004/0236543 A1 11/2004 Stephens
2004/0239678 A1 12/2004 Tsunashima et al.
2004/0254016 A1 12/2004 Shimazaki
2004/0259631 A1 12/2004 Katz et al.
2004/0259632 A1 12/2004 Crittenden et al.
2004/0259644 A1 12/2004 McCauley
2005/0027381 A1 2/2005 George et al.
2005/0027383 A1 2/2005 Nagata et al.
2005/0045025 A1 3/2005 Wells et al.
2005/0049047 A1 3/2005 Kitao
2005/0059480 A1 3/2005 Soukup et al.
2005/0060231 A1 3/2005 Soukup et al.
2005/0070349 A1 3/2005 Kimura
2005/0070359 A1 3/2005 Rodriquez et al.
2005/0073427 A1 4/2005 Gothard
2005/0075165 A1 4/2005 George et al.
2005/0082559 A1 4/2005 Hasan et al.
2005/0101364 A1 5/2005 Onoda et al.
2005/0115383 A1 6/2005 Chang
2005/0120865 A1 6/2005 Tada
2005/0120868 A1 6/2005 Hinman et al.
2005/0143174 A1 6/2005 Goldman et al.
2005/0164779 A1 7/2005 Okuniewicz
2005/0181864 A1 8/2005 Britt et al.
2005/0215319 A1 9/2005 Rigopulos et al.
2005/0221892 A1 10/2005 Takase
2005/0227767 A1 10/2005 Shimomura et al.
2005/0229769 A1 10/2005 Resnikoff
2005/0235809 A1 10/2005 Kageyama
2005/0250565 A1 11/2005 Nojiri et al.
2005/0252362 A1 11/2005 McHale et al.
2005/0255914 A1 11/2005 McHale et al.
2005/0255923 A1 11/2005 Aoki
2005/0273319 A1 12/2005 Dittmar et al.
2006/0003839 A1 1/2006 Lawrence et al.
2006/0009282 A1 1/2006 George et al.
2006/0009979 A1 1/2006 McHale et al.
2006/0026304 A1 2/2006 Price
2006/0030382 A1 2/2006 Okamura et al.
2006/0052161 A1 3/2006 Soukup et al.
2006/0052162 A1 3/2006 Soukup et al.
2006/0052163 A1 3/2006 Aida
2006/0052169 A1 3/2006 Britt et al.
2006/0058099 A1 3/2006 Soukup et al.
2006/0058101 A1* 3/2006 Rigopulos ........................ 463/35
2006/0063573 A1 3/2006 Ishikawa et al.
2006/0068911 A1 3/2006 Pirich et al.
2006/0107819 A1 5/2006 Salter
2006/0107822 A1 5/2006 Bowen
2006/0135253 A1 6/2006 George et al.
2006/0154710 A1 7/2006 Serafat
2006/0166744 A1 7/2006 Igarashi et al.
2006/0175758 A1 8/2006 Riolo
2006/0180008 A1 8/2006 Negoescu et al.
2006/0191401 A1 8/2006 Ueshima et al.
2006/0218239 A1 9/2006 Umezawa et al.
2006/0218288 A1 9/2006 Umezawa et al.
2006/0252503 A1 11/2006 Salter
2006/0258450 A1 11/2006 Ishihata et al.
2006/0266200 A1 11/2006 Goodwin
2006/0287106 A1 12/2006 Jensen
2006/0288842 A1 12/2006 Sitrick et al.
2006/0290810 A1 12/2006 Mallinson
2007/0015571 A1 1/2007 Walker et al.
2007/0026943 A1 2/2007 Yoshimura
2007/0059670 A1 3/2007 Yates
2007/0060312 A1 3/2007 Dempsey et al.
2007/0081562 A1 4/2007 Ma
2007/0088812 A1 4/2007 Clark
2007/0111802 A1 5/2007 Ishihara et al.
2007/0119292 A1 5/2007 Nakamura
2007/0140510 A1 6/2007 Redmann
2007/0155494 A1 7/2007 Wells et al.
2007/0162497 A1 7/2007 Pauws
2007/0163427 A1* 7/2007 Rigopulos et al. .............. 84/609
2007/0163428 A1 7/2007 Salter
2007/0168415 A1 7/2007 Matahira et al.
2007/0175317 A1 8/2007 Salter
2007/0178973 A1 8/2007 Camhi
2007/0226293 A1 9/2007 Sakurada et al.
2007/0232374 A1* 10/2007 Lopiccolo et al. ................ 463/7
2007/0234284 A1 10/2007 Tanner et al.
2007/0234881 A1 10/2007 Takehisa
2007/0234885 A1* 10/2007 Schmidt et al. ................. 84/722
2007/0243915 A1 10/2007 Egozy et al.
2007/0245881 A1* 10/2007 Egozy et al. .................... 84/609
2007/0256540 A1 11/2007 Salter
2007/0256541 A1 11/2007 McCauley
2007/0260984 A1 11/2007 Marks et al.
2007/0265095 A1 11/2007 Jonishi
2007/0270223 A1 11/2007 Nonaka et al.
2007/0273700 A1 11/2007 Nash et al.
2008/0009346 A1 1/2008 Jessop et al.
2008/0053295 A1 3/2008 Goto et al.
2008/0076497 A1 3/2008 Kiskis et al.
2008/0102958 A1 5/2008 Kitamura et al.
2008/0113698 A1* 5/2008 Egozy ............................... 463/7
2008/0113797 A1 5/2008 Egozy
2008/0115657 A1 5/2008 Wakiyama
2008/0125229 A1 5/2008 Jonishi
2008/0184870 A1 8/2008 Toivola
2008/0200224 A1 8/2008 Parks
2008/0202321 A1 8/2008 Goto et al.
2008/0220864 A1* 9/2008 Brosius et al. .................. 463/33
2008/0268943 A1 10/2008 Jacob
2008/0280680 A1* 11/2008 Dutilly et al. ................... 463/36
2008/0289477 A1 11/2008 Salter
2008/0311969 A1 12/2008 Kay et al.
2008/0311970 A1* 12/2008 Kay et al. .......................... 463/7
2009/0038467 A1 2/2009 Brennan
2009/0069096 A1 3/2009 Nishimoto
2009/0073117 A1 3/2009 Tsurumi et al.
2009/0075711 A1* 3/2009 Brosius et al. .................... 463/7
2009/0082078 A1 3/2009 Schmidt et al.
2009/0088249 A1 4/2009 Kay et al.
2009/0098918 A1 4/2009 Teasdale et al.
2009/0100992 A1 4/2009 Elion
2009/0104956 A1 4/2009 Kay et al.
2009/0135135 A1 5/2009 Tsurumi
2009/0165632 A1 7/2009 Rigopulos et al.
2009/0188371 A1 7/2009 Chiu et al.
2009/0189775 A1 7/2009 Lashina et al.
2009/0191932 A1 7/2009 Chiu et al.
2009/0233714 A1 9/2009 Toro
2009/0241758 A1 10/2009 Neubacker
2009/0258686 A1 10/2009 McCauley et al.
2009/0258700 A1 10/2009 Bright et al.
2009/0258703 A1 10/2009 Brunstetter
2009/0260508 A1 10/2009 Elion
2009/0265668 A1 10/2009 Esser et al.
2009/0282335 A1 11/2009 Alexandersson
2009/0310027 A1 12/2009 Fleming
2009/0317783 A1 12/2009 Noguchi
2010/0009749 A1 1/2010 Chrzanowski, Jr. et al.
2010/0009750 A1 1/2010 Egozy et al.
2010/0029386 A1 2/2010 Pitsch et al.
2010/0035688 A1 2/2010 Picunko

(56) References Cited

U.S. PATENT DOCUMENTS

| | | | |
|---|---|---|---|
| 2010/0041477 | A1 | 2/2010 | Kay et al. |
| 2010/0062405 | A1 | 3/2010 | Zboray et al. |
| 2010/0064238 | A1 | 3/2010 | Ludwig |
| 2010/0087240 | A1 | 4/2010 | Egozy et al. |
| 2010/0100848 | A1 | 4/2010 | Ananian et al. |
| 2010/0113117 | A1 | 5/2010 | Ku et al. |
| 2010/0120470 | A1 | 5/2010 | Kim et al. |
| 2010/0137049 | A1 | 6/2010 | Epstein |
| 2010/0151948 | A1 | 6/2010 | Vance et al. |
| 2010/0160038 | A1 | 6/2010 | Youm et al. |
| 2010/0192106 | A1 | 7/2010 | Watanabe et al. |
| 2010/0216598 | A1 | 8/2010 | Nicolas et al. |
| 2010/0245241 | A1 | 9/2010 | Kim et al. |
| 2010/0261146 | A1 | 10/2010 | Kim |
| 2010/0283723 | A1 | 11/2010 | Konishi |
| 2010/0300264 | A1 | 12/2010 | Foster |
| 2010/0300265 | A1 | 12/2010 | Foster et al. |
| 2010/0300266 | A1 | 12/2010 | Stoddard et al. |
| 2010/0300267 | A1 | 12/2010 | Stoddard et al. |
| 2010/0300268 | A1 | 12/2010 | Applewhite et al. |
| 2010/0300269 | A1 | 12/2010 | Applewhite |
| 2010/0300270 | A1 | 12/2010 | Applewhite et al. |
| 2010/0300272 | A1 | 12/2010 | Scherf |
| 2010/0304810 | A1 | 12/2010 | Stoddard |
| 2010/0304811 | A1 | 12/2010 | Schmidt et al. |
| 2010/0304812 | A1 | 12/2010 | Stoddard et al. |
| 2010/0304863 | A1 | 12/2010 | Applewhite et al. |
| 2010/0304865 | A1 | 12/2010 | Picunko et al. |
| 2010/0306655 | A1 | 12/2010 | Mattingly et al. |
| 2011/0010667 | A1 | 1/2011 | Sakai et al. |
| 2011/0021273 | A1 | 1/2011 | Buckley et al. |
| 2011/0028214 | A1 | 2/2011 | Bright et al. |
| 2011/0039659 | A1 | 2/2011 | Kim et al. |
| 2011/0098106 | A1 | 4/2011 | He et al. |
| 2011/0098109 | A1 | 4/2011 | Leake et al. |
| 2011/0118621 | A1 | 5/2011 | Chu |
| 2011/0140931 | A1 | 6/2011 | Geurts et al. |
| 2011/0151975 | A1 | 6/2011 | Mori |
| 2011/0159938 | A1 | 6/2011 | Umeda |
| 2011/0185309 | A1 | 7/2011 | Challinor et al. |
| 2011/0195779 | A1 | 8/2011 | Lau |
| 2011/0237324 | A1 | 9/2011 | Clavin et al. |
| 2011/0238676 | A1 | 9/2011 | Liu et al. |
| 2011/0256929 | A1 | 10/2011 | Dubrofsky et al. |
| 2011/0257771 | A1 | 10/2011 | Bennett et al. |
| 2011/0306396 | A1 | 12/2011 | Flury et al. |
| 2011/0306397 | A1 | 12/2011 | Fleming et al. |
| 2011/0306398 | A1 | 12/2011 | Boch et al. |
| 2011/0312397 | A1 | 12/2011 | Applewhite et al. |
| 2011/0312415 | A1 | 12/2011 | Booth et al. |
| 2012/0021833 | A1 | 1/2012 | Boch et al. |
| 2012/0052947 | A1 | 3/2012 | Yun |
| 2012/0063617 | A1 | 3/2012 | Ramos |
| 2012/0069131 | A1 | 3/2012 | Abelow |
| 2012/0094730 | A1 | 4/2012 | Egozy |
| 2012/0108305 | A1 | 5/2012 | Akiyama et al. |
| 2012/0108334 | A1 | 5/2012 | Tarama et al. |
| 2012/0143358 | A1 | 6/2012 | Adams et al. |

FOREIGN PATENT DOCUMENTS

| | | | |
|---|---|---|---|
| AU | 200194329 | | 10/2001 |
| AU | 2003285918 | | 5/2004 |
| AU | 2010229693 | A1 | 11/2011 |
| CA | 2587415 | A1 | 5/2005 |
| CA | 2609587 | A1 | 12/2005 |
| CA | 2720723 | A1 | 11/2009 |
| CA | 2757238 | A1 | 9/2010 |
| CA | 2760210 | A1 | 12/2010 |
| DE | 19716937 | A1 | 3/1998 |
| DE | 69804915 | T2 | 5/2002 |
| DE | 69726507 | T2 | 11/2004 |
| DE | 69832379 | T2 | 8/2006 |
| DE | 69739885 | | 7/2010 |
| EP | 0903169 | A2 | 3/1999 |
| EP | 919267 | A2 | 6/1999 |
| EP | 972550 | A2 | 1/2000 |
| EP | 974382 | A1 | 1/2000 |
| EP | 974954 | A1 | 1/2000 |
| EP | 978301 | A1 | 2/2000 |
| EP | 982055 | A1 | 3/2000 |
| EP | 992928 | A2 | 4/2000 |
| EP | 992929 | A2 | 4/2000 |
| EP | 993847 | A1 | 4/2000 |
| EP | 0997870 | A1 | 5/2000 |
| EP | 1003130 | A2 | 5/2000 |
| EP | 1022672 | A1 | 7/2000 |
| EP | 1029565 | A2 | 8/2000 |
| EP | 1029566 | A2 | 8/2000 |
| EP | 1029570 | A2 | 8/2000 |
| EP | 1029571 | A2 | 8/2000 |
| EP | 1031363 | A2 | 8/2000 |
| EP | 1031904 | A2 | 8/2000 |
| EP | 1033157 | A2 | 9/2000 |
| EP | 1033158 | A2 | 9/2000 |
| EP | 1043745 | A1 | 10/2000 |
| EP | 1043746 | A1 | 10/2000 |
| EP | 1048330 | A2 | 11/2000 |
| EP | 1061501 | A1 | 12/2000 |
| EP | 1064974 | A2 | 1/2001 |
| EP | 1064975 | A2 | 1/2001 |
| EP | 1066866 | A2 | 1/2001 |
| EP | 1079368 | A1 | 2/2001 |
| EP | 1 081 680 | A1 | 3/2001 |
| EP | 1081679 | A1 | 3/2001 |
| EP | 1082981 | A2 | 3/2001 |
| EP | 1082982 | A2 | 3/2001 |
| EP | 1082983 | A2 | 3/2001 |
| EP | 1088573 | A2 | 4/2001 |
| EP | 1 096 468 | A2 | 5/2001 |
| EP | 1114659 | A2 | 7/2001 |
| EP | 1122703 | A2 | 8/2001 |
| EP | 1125607 | A2 | 8/2001 |
| EP | 1125613 | A2 | 8/2001 |
| EP | 1127599 | A2 | 8/2001 |
| EP | 1130569 | A2 | 9/2001 |
| EP | 1132889 | A2 | 9/2001 |
| EP | 1134723 | A2 | 9/2001 |
| EP | 1136107 | A2 | 9/2001 |
| EP | 1138357 | A1 | 10/2001 |
| EP | 1139293 | A2 | 10/2001 |
| EP | 1145744 | A2 | 10/2001 |
| EP | 1145745 | A2 | 10/2001 |
| EP | 1145748 | A2 | 10/2001 |
| EP | 1145749 | A2 | 10/2001 |
| EP | 1150276 | A2 | 10/2001 |
| EP | 1151770 | A2 | 11/2001 |
| EP | 1151773 | A2 | 11/2001 |
| EP | 1157723 | A2 | 11/2001 |
| EP | 1159992 | A2 | 12/2001 |
| EP | 1160762 | A2 | 12/2001 |
| EP | 1161974 | A2 | 12/2001 |
| EP | 1 174 856 | A2 | 1/2002 |
| EP | 1170041 | A2 | 1/2002 |
| EP | 1178427 | A1 | 2/2002 |
| EP | 1184061 | A1 | 3/2002 |
| EP | 1187427 | A2 | 3/2002 |
| EP | 1192976 | A2 | 4/2002 |
| EP | 1195721 | A2 | 4/2002 |
| EP | 1197947 | A2 | 4/2002 |
| EP | 1199702 | A2 | 4/2002 |
| EP | 1199703 | A2 | 4/2002 |
| EP | 1 201 277 | A2 | 5/2002 |
| EP | 1206950 | A2 | 5/2002 |
| EP | 1208885 | A1 | 5/2002 |
| EP | 1214959 | A2 | 6/2002 |
| EP | 1220539 | A2 | 7/2002 |
| EP | 1228794 | A2 | 8/2002 |
| EP | 1245255 | A2 | 10/2002 |
| EP | 1249260 | A2 | 10/2002 |
| EP | 1258274 | A2 | 11/2002 |
| EP | 1264622 | A2 | 12/2002 |
| EP | 1270049 | A2 | 1/2003 |

(56) References Cited

FOREIGN PATENT DOCUMENTS

| | | | |
|---|---|---|---|
| EP | 1270050 | A2 | 1/2003 |
| EP | 1271294 | A2 | 1/2003 |
| EP | 1279425 | A2 | 1/2003 |
| EP | 1287864 | A2 | 3/2003 |
| EP | 1306112 | A1 | 5/2003 |
| EP | 1413340 | A1 | 4/2004 |
| EP | 000181482-0005 | | 9/2004 |
| EP | 1503365 | A1 | 2/2005 |
| EP | 1533010 | A1 | 5/2005 |
| EP | 1542132 | A1 | 6/2005 |
| EP | 1552864 | A1 | 7/2005 |
| EP | 1552865 | A1 | 7/2005 |
| EP | 1569171 | A1 | 8/2005 |
| EP | 1604711 | A1 | 12/2005 |
| EP | 1609513 | A1 | 12/2005 |
| EP | 1630746 | A1 | 3/2006 |
| EP | 1666109 | A1 | 6/2006 |
| EP | 1696385 | A2 | 8/2006 |
| EP | 1699017 | A2 | 9/2006 |
| EP | 1731204 | A1 | 12/2006 |
| EP | 1743680 | A1 | 1/2007 |
| EP | 1 758 387 | A1 | 2/2007 |
| EP | 1 825 896 | A1 | 8/2007 |
| EP | 000859418-0008 | | 2/2008 |
| EP | 000890447-0040 | | 4/2008 |
| EP | 000890447-0046 | | 4/2008 |
| EP | 2000190 | A2 | 12/2008 |
| EP | 2411101 | A2 | 2/2012 |
| FI | 200705530 | | 1/2009 |
| FI | 20096276 | | 12/2009 |
| GB | 2118809 | A | 11/1983 |
| GB | 2425730 | A | 11/2006 |
| GB | 2465918 | A | 6/2010 |
| GB | 2471871 | A | 1/2011 |
| HK | 1018021 | A1 | 10/2002 |
| HK | 1023734 | A1 | 2/2006 |
| IT | IN01685CN201 | | 1/2012 |
| JP | 7185131 | A | 7/1995 |
| JP | 3014386 | B1 | 8/1995 |
| JP | 2552427 | Y2 | 11/1996 |
| JP | 11151380 | A | 6/1999 |
| JP | 11156054 | A | 6/1999 |
| JP | 2922509 | | 7/1999 |
| JP | 11219443 | A | 8/1999 |
| JP | 2951948 | B1 | 9/1999 |
| JP | 2982147 | B1 | 11/1999 |
| JP | 11313979 | A | 11/1999 |
| JP | 3003851 | U | 1/2000 |
| JP | 2000014931 | | 1/2000 |
| JP | 2000037490 | | 2/2000 |
| JP | 3017986 | B1 | 3/2000 |
| JP | 3031676 | B1 | 4/2000 |
| JP | 2000107447 | A | 4/2000 |
| JP | 2000107458 | | 4/2000 |
| JP | 2000112485 | A | 4/2000 |
| JP | 2000116938 | A | 4/2000 |
| JP | 3053090 | B1 | 6/2000 |
| JP | 2000157723 | | 6/2000 |
| JP | 3066528 | U | 7/2000 |
| JP | 2000218046 | | 8/2000 |
| JP | 3088409 | B2 | 9/2000 |
| JP | 2000237454 | A | 9/2000 |
| JP | 2000237455 | A | 9/2000 |
| JP | 2000245957 | | 9/2000 |
| JP | 2000245964 | A | 9/2000 |
| JP | 2000245967 | | 9/2000 |
| JP | 2000250534 | | 9/2000 |
| JP | 200-288254 | | 10/2000 |
| JP | 2000/288254 | | 10/2000 |
| JP | 2000293292 | A | 10/2000 |
| JP | 2000293294 | A | 10/2000 |
| JP | 2000300838 | A | 10/2000 |
| JP | 2000300851 | A | 10/2000 |
| JP | 2000308759 | A | 11/2000 |
| JP | 2000317144 | A | 11/2000 |
| JP | 2000325665 | A | 11/2000 |
| JP | 2000350861 | A | 12/2000 |
| JP | 2001000610 | A | 1/2001 |
| JP | 2001009149 | A | 1/2001 |
| JP | 2001009152 | A | 1/2001 |
| JP | 2001009157 | A | 1/2001 |
| JP | 2001046739 | A | 2/2001 |
| JP | 2001062144 | A | 3/2001 |
| JP | 2001070637 | A | 3/2001 |
| JP | 2001070640 | A | 3/2001 |
| JP | 2001070652 | A | 3/2001 |
| JP | 2001075579 | A | 3/2001 |
| JP | 2001096059 | A | 4/2001 |
| JP | 2001096061 | A | 4/2001 |
| JP | 2001129244 | A | 5/2001 |
| JP | 2001145777 | A | 5/2001 |
| JP | 2001145778 | A | 5/2001 |
| JP | 3179769 | B2 | 6/2001 |
| JP | 2001170352 | A | 6/2001 |
| JP | 2001175254 | A | 6/2001 |
| JP | 3187758 | B2 | 7/2001 |
| JP | 2001190834 | A | 7/2001 |
| JP | 2001190835 | A | 7/2001 |
| JP | 2001190844 | A | 7/2001 |
| JP | 2001198351 | A | 7/2001 |
| JP | 2001198352 | A | 7/2001 |
| JP | 2001198354 | A | 7/2001 |
| JP | 3202733 | B2 | 8/2001 |
| JP | 2001212369 | A | 8/2001 |
| JP | 2001218980 | A | 8/2001 |
| JP | 2001222280 | A | 8/2001 |
| JP | 2001224850 | A | 8/2001 |
| JP | 2001231904 | A | 8/2001 |
| JP | 2001232062 | A | 8/2001 |
| JP | 2001-252470 | | 9/2001 |
| JP | 3204652 | B2 | 9/2001 |
| JP | 2001252467 | A | 9/2001 |
| JP | 2001259224 | A | 9/2001 |
| JP | 2001269482 | A | 10/2001 |
| JP | 2001273517 | A | 10/2001 |
| JP | 2001293246 | | 10/2001 |
| JP | 2001293254 | A | 10/2001 |
| JP | 2001293256 | A | 10/2001 |
| JP | 2001299975 | A | 10/2001 |
| JP | 2001312260 | A | 11/2001 |
| JP | 2001312740 | A | 11/2001 |
| JP | 2001314645 | A | 11/2001 |
| JP | 2001321565 | A | 11/2001 |
| JP | 2001344049 | A | 12/2001 |
| JP | 2001353374 | A | 12/2001 |
| JP | 3245139 | B2 | 1/2002 |
| JP | 2002000936 | A | 1/2002 |
| JP | 2002018123 | A | 1/2002 |
| JP | 2002018134 | A | 1/2002 |
| JP | 2002028368 | A | 1/2002 |
| JP | 3258647 | B2 | 2/2002 |
| JP | 3261110 | B2 | 2/2002 |
| JP | 2002045567 | A | 2/2002 |
| JP | 2002056340 | A | 2/2002 |
| JP | 2002066127 | A | 3/2002 |
| JP | 2002066128 | A | 3/2002 |
| JP | 2002084292 | A | 3/2002 |
| JP | 3270928 | B2 | 4/2002 |
| JP | 2002116752 | A | 4/2002 |
| JP | 2002140727 | A | 5/2002 |
| JP | 2002143567 | A | 5/2002 |
| JP | 2002153673 | A | 5/2002 |
| JP | 3306021 | B2 | 7/2002 |
| JP | 2002204426 | A | 7/2002 |
| JP | 3310257 | B2 | 8/2002 |
| JP | 3317686 | B2 | 8/2002 |
| JP | 3317956 | B2 | 8/2002 |
| JP | 2002224435 | A | 8/2002 |
| JP | 2002239223 | A | 8/2002 |
| JP | 2002239233 | A | 8/2002 |
| JP | 3320700 | B2 | 9/2002 |
| JP | 3321111 | B2 | 9/2002 |
| JP | 3333773 | B2 | 10/2002 |
| JP | 3338005 | B2 | 10/2002 |

(56) References Cited

FOREIGN PATENT DOCUMENTS

| | | | |
|---|---|---|---|
| JP | 2002282417 | A | 10/2002 |
| JP | 2002282418 | A | 10/2002 |
| JP | 2002292123 | A | 10/2002 |
| JP | 2002292139 | A | 10/2002 |
| JP | 2002301263 | A | 10/2002 |
| JP | 3345591 | B2 | 11/2002 |
| JP | 3345719 | B2 | 11/2002 |
| JP | 2002325975 | A | 11/2002 |
| JP | 3351780 | B2 | 12/2002 |
| JP | 2002360937 | A | 12/2002 |
| JP | 3361084 | B2 | 1/2003 |
| JP | 3370313 | B2 | 1/2003 |
| JP | 3371132 | B2 | 1/2003 |
| JP | 2003000951 | A | 1/2003 |
| JP | 2003010541 | A | 1/2003 |
| JP | 2003010542 | A | 1/2003 |
| JP | 2003019346 | A | 1/2003 |
| JP | 2003030686 | A | 1/2003 |
| JP | 2003058317 | A | 2/2003 |
| JP | 3392833 | B2 | 3/2003 |
| JP | 2003117233 | A | 4/2003 |
| JP | 2003126548 | A | 5/2003 |
| JP | 3417555 | B2 | 6/2003 |
| JP | 3417918 | B2 | 6/2003 |
| JP | 3420221 | B2 | 6/2003 |
| JP | 2003175279 | A | 6/2003 |
| JP | 3425548 | B2 | 7/2003 |
| JP | 3425552 | B2 | 7/2003 |
| JP | 3433918 | B2 | 8/2003 |
| JP | 3439187 | B2 | 8/2003 |
| JP | 2003236244 | A | 8/2003 |
| JP | 3442730 | B2 | 9/2003 |
| JP | 3448043 | B2 | 9/2003 |
| JP | 2003256552 | A | 9/2003 |
| JP | 3458090 | B2 | 10/2003 |
| JP | 3470119 | B2 | 11/2003 |
| JP | 2003334387 | A | 11/2003 |
| JP | 3491759 | B1 | 1/2004 |
| JP | 2004016315 | A | 1/2004 |
| JP | 2004016388 | A | 1/2004 |
| JP | 3496874 | B2 | 2/2004 |
| JP | 3500379 | B1 | 2/2004 |
| JP | 3500383 | B1 | 2/2004 |
| JP | 2004033266 | A | 2/2004 |
| JP | 2004097610 | A | 4/2004 |
| JP | 2004105309 | A | 4/2004 |
| JP | 2004121397 | A | 4/2004 |
| JP | 3526302 | B1 | 5/2004 |
| JP | 2004141261 | A | 5/2004 |
| JP | 3534345 | B1 | 6/2004 |
| JP | 2004164519 | A | 6/2004 |
| JP | 2004166994 | A | 6/2004 |
| JP | 3545755 | B2 | 7/2004 |
| JP | 3545983 | B2 | 7/2004 |
| JP | 3546206 | B2 | 7/2004 |
| JP | 3547374 | B2 | 7/2004 |
| JP | 2004192069 | A | 7/2004 |
| JP | 2004201937 | A | 7/2004 |
| JP | 3561456 | B2 | 9/2004 |
| JP | 3566195 | B2 | 9/2004 |
| JP | 3573288 | B2 | 10/2004 |
| JP | 3576994 | B2 | 10/2004 |
| JP | 3582716 | B2 | 10/2004 |
| JP | 2004283249 | A | 10/2004 |
| JP | 2004298469 | A | 10/2004 |
| JP | 2004321245 | A | 11/2004 |
| JP | 3597465 | B2 | 12/2004 |
| JP | 2004337256 | A | 12/2004 |
| JP | 3611807 | B2 | 1/2005 |
| JP | 2005046445 | A | 2/2005 |
| JP | 2005049913 | A | 2/2005 |
| JP | 3626711 | B2 | 3/2005 |
| JP | 3634273 | B2 | 3/2005 |
| JP | 2005095440 | A | 4/2005 |
| JP | 3656118 | B2 | 6/2005 |
| JP | 3686906 | B2 | 8/2005 |
| JP | 3699660 | B2 | 9/2005 |
| JP | 2005261586 | A | 9/2005 |
| JP | 3702269 | B2 | 10/2005 |
| JP | 2005287830 | A | 10/2005 |
| JP | 2005301578 | A | 10/2005 |
| JP | 3715513 | B2 | 11/2005 |
| JP | 2005319025 | A | 11/2005 |
| JP | 3727275 | B2 | 12/2005 |
| JP | 2006020758 | A | 1/2006 |
| JP | 3753425 | B2 | 3/2006 |
| JP | 2006075264 | A | 3/2006 |
| JP | 2006116046 | A | 5/2006 |
| JP | 2006116047 | A | 5/2006 |
| JP | 2006192157 | A | 7/2006 |
| JP | 3804939 | B2 | 8/2006 |
| JP | 3816931 | B2 | 8/2006 |
| JP | 3822887 | B2 | 9/2006 |
| JP | 3831695 | B2 | 10/2006 |
| JP | 3869175 | B2 | 1/2007 |
| JP | 2007029589 | A | 2/2007 |
| JP | 3890445 | B2 | 3/2007 |
| JP | 2007504901 | A | 3/2007 |
| RU | 2010146213 | A | 5/2012 |
| TW | 340049 | | 3/2009 |
| TW | 200951764 | A | 12/2009 |
| TW | 201006526 | A | 2/2010 |
| TW | 322023 | | 3/2010 |
| TW | 201116318 | A | 5/2011 |
| WO | WO-9938588 | A1 | 8/1999 |
| WO | WO-01/63592 | A2 | 8/2001 |
| WO | WO-0230535 | A1 | 4/2002 |
| WO | WO-2004002590 | A1 | 1/2004 |
| WO | WO-2004002594 | A1 | 1/2004 |
| WO | WO-200424256 | A1 | 3/2004 |
| WO | WO-2004024263 | A1 | 3/2004 |
| WO | WO-2004027631 | A1 | 4/2004 |
| WO | WO-2004030779 | A1 | 4/2004 |
| WO | WO-2004039055 | A2 | 5/2004 |
| WO | WO-2004052483 | A1 | 6/2004 |
| WO | WO-2004053800 | A1 | 6/2004 |
| WO | WO-2004082786 | A1 | 9/2004 |
| WO | WO-2004087272 | A1 | 10/2004 |
| WO | WO-2004101093 | A1 | 11/2004 |
| WO | WO-2004107270 | A1 | 12/2004 |
| WO | WO-2005027062 | A1 | 3/2005 |
| WO | WO-2005027063 | A1 | 3/2005 |
| WO | WO-2005030354 | A1 | 4/2005 |
| WO | WO-2005099842 | A1 | 10/2005 |
| WO | WO-2005107902 | A1 | 11/2005 |
| WO | WO-2005/113096 | A1 | 12/2005 |
| WO | WO-2005114648 | A1 | 12/2005 |
| WO | WO-2006006274 | A1 | 1/2006 |
| WO | WO-2006075494 | A1 | 7/2006 |
| WO | WO-2007/055522 | A1 | 5/2007 |
| WO | WO-2007/115299 | A2 | 10/2007 |
| WO | WO-2007111247 | A1 | 10/2007 |
| WO | WO-2010018485 | A1 | 2/2010 |
| WO | WO-2011067469 | A1 | 6/2011 |

OTHER PUBLICATIONS

Rockstar vs. Guitar Hero: (The Rebel Yell)—Nov. 2008.*

GuitarFreaks—Wikipedia, the free encyclopedia—(Publisher—Konami, Konami Digital Entertainment) Release Date 1998.*

Guitar Hero—Wikipedia, the free encyclopedia—Nov. 2005.*

“BVH File Specification”, Character Studio, http://web.archive.org/web/20060321075406/http://character-studio.net/bvh_file_specification.htm, Mar. 21, 2006 (16 pages).

[Video] “E3 2010 Live Demo”, where Ubi talked about MJ:TE for Kinect (<http://www.qametrailers.com/video/e3-2010-michael-jackson/101449>) (date not available).

[Video] MJ the Experience Kinect: release Apr. 2011, http//www.youtube.com/watch?v=N7oyxHIP48A.

[Video] ’Don’t Stop’ Gameplay Trailer: <http://www.gametrailers.com/video/dont-stop-michael-jackson/707336> (Nov. 10, 2010).

[Video] ’Ghosts’ Gameplay Trailer: <http://www.gametrailers.com/video/ghosts-gamplay-michael-jackson/706825> (Oct. 27, 2010).

(56) References Cited

OTHER PUBLICATIONS

[Video] Dance Summit 2001: Bust A Groove (Released Nov. 2, 2000 for PS2); <http://www.youtube.com/watch?v=E8NTGHYQcM>.
[Video] Dancing With the Stars—Activision, Zoe Mode; <http://www.youtube.com/watch?v=C7zBVfEJ0gg> (Oct. 2007).
[Video] Dancing with the Stars: We Dance—Activision, Zoe Mode; <http://www.youtube.com/watch?v=3IG0b-CT8vs> (Oct. 2008).
[Video]DDR Hottest Party; <http://www.youtube com/watch?v=zk20hEzGmUY> (Sep. 2007).
[Video] E3 2010 Live Demo <http://www.gametrailers.com/video/e3-2010-michael-jackson/101449>; (Jun. 14, 2010).
[Video] Eyetoy Groove for PS2; <http://www.youtube.com/watch?v=c80aaOU_fuE>. Apr. 2004.
[Video] Gamescom '10—Billie Jean Demo <http://www.gametrailers.com/video/gc-10-michael-jackson/703294> (:58-1:13) (Aug. 20, 2010).
[Video] Gamescom '10—Working Day and Night Demo <http://www.gametrailers.com/video/gc-10-michael-jackson/703295> (Aug. 20, 2010).
[Video] Grease Dance—505 Games: release—Oct. 2011. http://www.youtube.com/watch?v=PaGBHSB2urg.
[Video] Hannah Montana: Spotlight World Tour (Released Nov. 6, 2007 for Wii); <http://www.youtube.com/watch?v=WtyuU2NaL3Q>.
[Video] Britney's Dance Beat (Released May 8, 2002 for PS2); <http://www.youtube.com/watch?v=-KR1dRGNX_w>.
[Video] Dance Dance Revolution: Hottest Party 3 (Released Sep. 27, 2009 for Wii) <http://www.youtube.com/watch?v=zk20hEzGmUY>.
[Video] Dance on Broadway—Ubisoft, Longtail Studios; <http://www.youtube.com/watch?v=eYaP-dT4z-M> (Jun. 6, 2010).
[Video] Dance on Broadway: Jun. 2010 (http://youtu.be/Wi9Y5HHcvtY).
[Video] Dancing with the Stars: Oct 2007 (http://www.youtube.com/watch?v=8UChG2v5DI).
Amplitude for Playstation. Retrieved from the Internet: www.target.com/gp/detail.hbnI/601-0682676-9911341?asin=B0000859TM&AFID. Retrieved on Feb. 22, 2005. 1 page.
Amplitude Review by Ryan Davis. Retrieved from the Internet: www.gamespot.com/ps2/puzzle/ampli~de /printable_6023980.html. Retrieved on Jun. 11, 2012. 4 pages.
Amplitude. Retrieved from the Internet: www.gamesquestdirect.com/71171972582.htrnl. Retrieved on Jun. 8, 2012. 2 pages.
Amplitude: Sony's Rocking Rhythm Game Outdoes Itself on All Fronts by Douglass C. Perry. Retrieved from the Internet: http://ps2.ign.com/articles/390/390620pI.thml. Feb. 22, 2005. 6 pages.
Association of British Scrabble Players. "Rolling System" ABSP, http://www.absp.org.uk/results/ratings_detail.shtml. Retrieved May 25, 2011 (4 pages).
Beat Planet Music (Import) Review by Christian Nutt. Retrieved from the Internet: www.gamespot.com/ps/ action/beatplanetmusicIprintable_2546762.html. Retrieved on Jun. 11, 2012. 3 pages.
Beatmania IIDX 9 Style. Retrieved from the Internet: www.play-asia.com/paOS-13-71-8-iu.html. Retrieved on Feb. 22, 2005. 2 pages.
Beatmania PlayStation Review from www.GamePro.com/sony/psx/games/reviews/89.shtml. Retrieved on Feb. 22, 2005. 1 page.
Beatmania Review. Retrieved from the Internet: www.gamesarefun.com/gamesdb/review.php?reviewid=294. Retrieved on Jun. 11, 2012. 1 page.
Beatmania DX 7 Style. Retrieved from the Internet: www.lik-sang.com/Info.php?category=27&products id=4061. Retrieved on Feb. 22, 2005. 1 page.
Beatnik Patent Sale Offering, Nov. 2008 (81 pp).
Bishop, Sam; Frequency: If you decide to pick up this game, you better give up ont he idea of getting a full night of sleep. via www.ign.com [online], Nov. 26, 2001 [retrieved on Mar. 9, 2006]. Retrieved from the Internet <URL: http://ps2.ign.com/articles/166/166450p1.html>. Retrieved on Jun. 8, 2012. 8 pages.
Boombox Icons, http://findicons.com/search/boombox, viewed on Jul. 31, 2012 copyright 2010 (1 page).
Bust A Groove Review by Jeff Gerstmann. Retrieved from the Internet: www.gamespolcom/ps/puzzlelbusta groove/printable_2546923.html. Retrieved on Jun. 11, 2012. 9 pages.
Bust A Groove. Retrieved from the Internet: www.buyritegames.com/product_information. asp?rc=frgl&number=PS-BUSTA2. Retrieved on Feb. 22, 2005. 1 page.
Bust A Groove. Retrieved from the Internet: www.estarland.com/index.asp?page=Playstation &cat=F&oroduct=6257&q. Retrieved on Jun. 11, 2012. 2 pages.
Bust A Groove: 989 Studios Best Game of the Year is a Funky Dance Sim thars Got the Fever by Doug Peny. Retrieved from the Internet http://psx.com/articles/152/152308pl.html. Retrieved on Jun. 8, 2012. 5 pages.
Dance Dance Revolution Review by Andy Chien. Retrieved from the Internet www.gamin-age.com/reviews/archive/old reviews/psx/ddr. Retrieved on Feb. 22, 2005. 3 pages.
Dance Dance Revolution Review by Ryan Davis. Retrieved from the Internet www.gamespot.com/ps/puzzle/dancedancerevolutionfprintable_2699724.html. Retrieved on Jun. 11, 2012. 9 pages.
Dance Dance Revolution, Konami via www.ign.com [online], Apr. 4, 2001 [retrieved on Mar. 1, 2006]. Retrieved from the Internet <URL: http://psx.ign.com/articles/161/161525p1.html>. Retrieved on Jun. 14, 2012. 7 pages.
Dance Dance Revolution. Retrieved from the Internet: www.ebgames.com/ebxlproduct/224 789.asp. Retrieved on Feb. 22, 2005. 2 pages.
Dancing with the Stars Game Manual (1 page). Date not available.
Dave H, et al. StepMania Tutorial. Nov. 3, 2004. <http://web.archive.org/web/200411031145/www.stepmania.com.stepmania/wiki.php?pagename=Tutorial>. Retrieved on Jun. 19, 2012. 7 pages.
Def Jam Vendetta Review by Alex Navarro. Retrieved from the Internet www.gamespot.com/ps2/actionf actionfdefjamvendetta/prIntable_6024297 .html. Retrieved on Jun. 11, 2012. 10 pages.
Def Jam Vendetta. Retrieved from the Internet www.ebgames.com/ebxlproduct/232378.asp. Retrieved on Feb. 22, 2005. 2 pages.
Def Jam Vendetta: Rapper's Delight or Fight-Night Fright? Smash Sumthin' and Find Out by Jon Robinson. Mar. 31, 2003. Retrieved from the Internet http://ps2.ign.com/articles/391/391713pI.html. Retrieved on Jun. 8, 2012. 6 pages.
Digital Play: Reloaded. Opening Reception. Museum of the Moving Image. Mar. 19, 2005. <http://web.archive.Org/web/20050319060247/http://www.movingimage.us/site/screenings/contenV2005/digital_play_reloaded.html>. 1 page.
Donkey Konga Review by Ryan Davis. Retrieved from the Internet: www.gamespot.com/gamecubelpuzzle/donkeykonga/printable_6108977.html. Retrieved on Jun. 11, 2012. 11 pages.
Donkey Konga. Retrieved from the Internet: www.ebgames.com/ebx/product/244024.asp. Retrieved on Jun. 11, 2012. 2 pages.
Donkey Konga: Could a Game Featuring Donkey Kong and Mini-Bongos ever Fail? Our Ful Review by Juan Castro. Retrieved from the Internet: cube.ign.com/articles/550/550723pI.html. Retrieved on Jun. 8, 2012. 6 pages.
DrumMana w/ Drum Set. Retrieved from the Internet www.estarland.com/index.asp?page=Playstation2&cat=Rd&product=181268 &q. Retrieved on Jun. 11, 2012. 2 pages.
DrumMania (Import) Review by Jeff Garstmann. Retrieved from the Internet: www.gamespot.com/ps2/actionfdrummania/prinlable_2546356.html. Retrieved on Jun. 11, 2012. 9 pages.
DrumMania OST. Retrieved from the Internet www.lik-sang.corn/info/php?category=264& products id=4793. Retrieved on Feb. 22, 2005. 2 pages.
DrumMania Review by Wynfwad. Retrieved from the Internet www.gamefaqs.com/console/ps2/review/R56573.html. Retrieved on Jun. 11, 2012. 2 pages.
ESRB Game Ratings: Game Rating & Descriptor Guide' via www.esrb.org[online], Retrieved from the Internet: <URL: http:/Arvww.esrb.org/esrbratings_guide.asp#symbols>. Retrieved on Jun. 14, 2012. 3 pages.

(56) References Cited

OTHER PUBLICATIONS

Eye Toy Groove with Camera (Playstation 2). Retrieved from the Internet www.jr.com/JRProductPage.process?Product Code=PS2+97400&JRSource=google. Retrieved on Feb. 22, 2005. 1 page.
Eye Toy Groove with Eye Toy Camera PS2. Retrieved from the Internet: www.walmart.com/catalog/product.gsp?dest= 9999999997&product id-2607013&s. Retrieved on Feb. 22, 2005. 1 page.
Eye Toy: Groove—The Little Camera That Could comes Back with a Few New Tricks by Ed Lewis. Retrieved from the Internet: http:/ps2.ign.corn/artjcles/507/507854pI.html. Retrieved on Jun. 8, 2012. 8 pages.
Eye Toy: Groove Review by Ryan Davis. Retrieved from the Internet: www.gamespot.com/ps2/puzzle/eyetoygroove/printable_6094754.html. Retrieved on Jun. 11, 2012. 10 pages.
Frequency—Pre-Played. Retrieved from the Internet www.ebgames.com/ebx/product/203370.asp. Retrieved on Feb. 22, 2005. 2 pages.
Frequency PS2 Review from GamePro.com, written by Dan Electro on Nov. 26, 2001. Retrieved from the Internet: www.gamepro.com/sony/ps2/games/reviews/18464.shtml. Retrieved on Jun. 11, 2012. 2 pages.
Frequency PS2. Retrieved from the Internet: www.walmart.com/catalog/producLgsp7dests9999999997&product id=1635738&s. Retrieved on Feb. 22, 2005. 2 pages.
Frequency Review by Ryan Davis. Retrieved from the Internet:www.gamespot.com/ps2/puzzle/frequency/printable 2827476.html. Retrieved on Jun. 19, 2012. 9 pages.
Get on Da Mic Overview by Matt Gonzales. Retrieved from the Internet www.gamechronides.com/reviews/ps2/getondamic/body.htm. Retrieved on Jun. 11, 2012. 3 pages.
Get on Da Mic Review by Jeff Gerstmann. Retrieved from the Internet www.gamespot.cx)rri/ps2/puzzle/getondamic/printable 6110242.html. Retrieved on Jun. 11, 2012. 10 pages.
Get on Da Mic. Retrieved from the Internet: www.ebgames.com/ebx/product/245102.asp. Retrieved on Jun. 11, 2012. 2 pages.
Gitaroo Man. Retrieved from the Internet www.estartand.com/index.asp?pages=Piaystation2&cat=PZ&product=676&Q . . Retrieved on Jun. 14, 2012. 2 pages.
Gitaroo-Man Review by David Smith. Retrieved from the Internet htt£-ys2.ign.conVara'c!es/354/354413pjLhtml. Retrieved on Jun. 11, 2012. 4 pages.
Gitaroo-Man Review by Ryan Davis. Retrieved from the Internet: www.gamesrx)t.coiTi/ps2/puzzle/gitaroomart/printable 2847915.html. Retrieved on Jun. 19, 2012. 9 pages.
Gitaroo-Man. Retrieved from the Internet www.buyritegames.com/productjnformation.asp?re=frgl&number=PS2-GITARO. Retrieved on Feb. 22, 2005. 1 page.
Guitar Freaks (Import) Review by Sam Kennedy. Retrieved from the Internet: www.gamespot.com/pslaction/guitarfreaks/printable_2545966.html. Retrieved on Jun. 11, 2012. 10 pages.
Guitar Freaks Review by Wade Monnig. Retrieved from the Internet: www.gamesarefun.com/gamesdb/review. php? .reviewid=301. Retrieved on Jun. 11, 2012. 3 pages.
Guitar Freaks Sony. Retrieved from the Internet www.gameexpress.com/product_detail.cfm.?UPC=SCPS45422. Retrieved on Feb. 22, 2005. 1 page.
Guitar Freaks with Guitar. Retrieved from the Internet: www.buyritegames.com/product_information.asp?rc=frgl&number= PSJ-GUiIWG. Retrieved on Feb. 22, 2005. 1 page.
Guitar Hero (video game)—Wikipedia, the free encyclopedia—(Publisher—RedOctane) Release Date Nov. 2005. 25 pages.
Guitar Hero—Wikipedia, the free encyclopedia—Nov. 2005. http://en.wikipedia.org/w/index.php?title=guitaryhero&oldid= 137778068. Retrieved on May 22, 2012. 5 pages.
GuitarFreaks—Wikipedia, the free encyclopedia—(Publisher—Konami, Konami Digital Entertainment) Release Date 1998. Accessed on Mar. 19, 2009. 5 pages.
International Search Report issued for PCT/US2010/054300, dated May 31, 2011 (5 pages).
International Search Report, PCT/US2006/062287, Mailed on May 10, 2007. 2 pages.
Ipodgames.com Tips. Dec. 4, 2004. <http://web.archive.org/web/20041204032612Awww.ipodgames.com/tips.html> 1 page.
Karaoke Revolution Review by Jeff Gerstmann. Retrieved from the Internet www.gamespot.com/ps2/puzzle/karaokerevolution/printable . . . 6081709.html. Retrieved on Jun. 14, 2012. 10 pages.
Karaoke Revolution. Retrieved from the Internet: www.ebgames.com/ebxIproduct/24806.asp. Retrieved on Feb. 22, 2005. 2 pages.
Karaoke Revolution: The Revolution will be Televised by Ed Lewis. Retrieved from the Internet: http://ps2.ign.com/articles/458/458064p1.html. Retrieved on Jun. 8, 2012. 7 pages.
Kuwayama, Y. Trademarks & Symbols, vol. 2: Symbolical Designs, Van Nostrand Reinhold Company, (Nov. 4, 1980). 4 pages.
Lohman, "Rockstar vs. Guitar Hero," (The Rebel Yell). Nov. 13, 2008, accessed on Mar. 19, 2009. 5 pages.
Mad Maestro!—Pre-Played. Retrieved from the Internet: www.ebgames.com/ebx/product/217604.asp. Retrieved on Feb. 22, 2005. 2 pages.
Mad Maestro! by Ryan Davis. Retrieved from the Internet: www.gamespot.com/ps2/puzzle.madmaestro/printable_2856821.html. Retrieved on Jun. 19, 2012. 9 pages.
Mad Maestro: The First Orchestra-conducting Sim on US Soil—Is It All It Could Have Been? by David Smith. Retrieved from the Internet http://ps2.ign.com/articles/3551355561 p1.html. Retrieved on Jun. 8, 2012. 6 pages.
Microsoft Office Online Clip Art, http://office.microsoft.com/en-us/clipart/results.aspx?Scope=MC,MM,MP,MS&PoleAssetID= MCJ04316180000&Querty=lcons&CTT=6&Origin= EC01017435m (Feb. 21, 2007) (1 page).
Microsoft PowerPoint Handbook, (1 page) (1992).
Mojib Ribbon Playtest by Anoop Gantayat. Retrieved from the Internet: htto://os2.ion.com/articles/442/442204p1.html. Retrieved on Jun. 8, 2012. 4 pages.
Mojib Ribbon-Review. Retrieved from the Internet: www.ntsc-uk.com/review.php?platform=ps2&game=MoiibRibbon. Retrieved on Jun. 14, 2012. 2 pages.
Mojib Ribbon. Retrieved from the Internet: www.lik-sang.comIInfo.php?category=27&products id=3805&PHPSESSID=b9eQca. Retrieved on Feb. 22 2005. 1 page.
Mojib Ribbon. Retrieved from the Internet: www.ncsxshop.com/cgi-bin/shop/SCPS.11033.html. Retrieved on Jun. 14, 2012. 2 pages.
NCSX.com; Game Synpopsys of Guitar Freaks and DrumMania Masterpiece Gold, with a date of Mar. 8, 2007, and with an Archive.org Wayback Machine Verified date of May 17, 2007, downloaded from http://web.archiv.org/web/20070517210234/http://www.ncsx.com/2007/030507/guitarfreaks_gold.htm (4 pages).
Non-Final Office Action as issued by the United States Patent and Trademark Office for U.S. Appl. No. 12/474,899, dated Jan. 19, 2011, 7 pages.
PaRappa the Rapper 2. Retrieved from the Internet:wvAV.amazon.eom/exedobidos/tg/deteil/-/B00005UNWD/104-4695527-8827110. Retrieved on Feb. 22, 2005. 2 pages.
PaRappa The Rapper Review by Jer Horwitz. Retrieved from the Internet: www.gamespot.com/pslpuzzlelparappatherapper/printable_2548866.html. Retrieved on Jun. 14, 2012. 9 pages.
Parappa the Rapper. Retrieved from the Internet: www.estarland.com/index.asp?page=Playstation&cat=F&product=6871&q. Retrieved on Jun. 11, 2012. 2 pages.
Parappa The Rapper: PaRapper the Rapper Is finally here, but does it live up to the hype? by Adam Douglas. Retrieved from the Internet http://psx.ign.com/articlesl150/150490p1.html. Retrieved on Jun. 8, 2012. 2 pages.
PopCap Games Site Review via www.download-free-games.com, retrieved on Mar. 3, 2006. Retrieved from the Internet <URL:http.www.download-freegames.com/reviews/popcap_games.htm>. 2 pages.
Ramsey, A. Guitar Freaks and Drum Mania Masterpiece Gold FAQ v. 1.04, Apr. 2, 2007, downloaded from http://www.gamefaqs.com/console/ps2/file/937670/47326. 3 pages.
RedOctane. "Guitar Hero 2 Manual" Activision Publishing, Inc. (2006) (13 pages).

(56) References Cited

OTHER PUBLICATIONS

Rez PlayStation. Retrieved from the internet: http://global.yesasia.com/en/PrdDept.aspx/pjd-1002847668. Retrieved on Jun. 14, 2012. 1 page.
Rez Review by Jeff Gerstmann. Retrieved from the Internet:www.qamespot.com/ps2/action/rez/printable2838815.html. Retrieved on Jun. 11, 2012. 9 pages.
Rez. Retrieved from the Internet: www.estarland.com/playstation2.product.5426.html. Retrieved on Jun. 14, 2012. 2 pages.
Rez: You May Not Understand This Review. We May Not Either. But you should certainly play this game by. David Smith. Retrieved from the Internet: http://m.ign.com/articles/2002/01/09/rez. Retrieved on Jun. 11, 2012. 3 pages.
SingStar Party (SingStar2) Bundle. Retrieved from the Internet: www.gameswarehouse.com.Au/longpage.asp?gameid=10329. Retrieved on Feb. 22, 2005. 2 pages.
SingStar Party. Retrieved from the Internet: www.argos.co.uk/Webapp/wcs/stores/servlet/ProductDisplay?storeld=10001&langld. Retrieved on Feb. 22, 2005. 1 page.
SingStar Review (PS2) by James Hamer-Mortonl. Retrieved from the Internet http://ps2.twomtown.net/en uk/articles/art.print.php?id=5279. Retrieved on Jun. 11, 2012. 5 pages.
SingStar Review by Luke Van Leuveren. Retrieved from the Internet http://palgn.com.aii/article.php7id-1282. Retrieved on Jun. 11, 2012. 5 pages.
Space Channel 5 Special Edition Review by Brad Shoemaker. Retrieved from the Internet: www.gamespot.corn/ps2/puzzle/spacecriannel5pait2/printeble_6085137.h Retrieved on Jun. 11, 2012. 10 pages.
Space Channel 5. Retrieved from the Internet: www.lik-sang.com/info.php?products_is=2050 &likref=fro_gle4. Retrieved on Feb. 22, 2005. 1 page.
Space Channel 5: Description. Retrieved from the Internet: www.buyritegames.com/product_information.asp?rc=frgl&number=DC-SPACEC5. Retrieved on Feb. 22, 2005. 1 page.
Space Channel 5: Special Edition by Jason Thompson. Retrieved from the Internet www.popmattere.com/mulumerJia/reviews/s/space-channel-5.shtml. Retrieved on Jun. 8, 2012. 2 pages
Taiko Drum Master Review by Justin Calvert. Retrieved from the Internet: www.gamespot.com/ps2 puzzie/taikodrummaster/printable_6111767.html. Retrieved on Jun. 14, 2012. 10 pages.
Taiko Drum Master w/ Drum. Retrieved from the Internet: www.ebgames.com/ebx/product/244015.asp. Retrieved on Jun. 14, 2012. 2 pages.
Taiko no Tatsujin. Retrieved from the Internet htlpy/games.channel.aol.com/review.adp? qameID-7569. Retrieved on Feb. 22, 2005. 3 pages.
Thalmann, "L'animation par ordinateur" http://web.archive.org/web/20060421045510/http://vrlab.epfl.ch/{thalmann/CG/infogr.4.pdf>, Apr. 21, 2006 (52 page).
Vib Ribbon (PSX): Homepage, Screenshots by James Anthony. http://www.vib-ribbon.com/vibhtml/english/index.html. Retrieved on Jun. 14, 2012. 1 page.
Vib-Ribbon (Import) Review by Jeff Gerstmann. Retrieved from the Internet: www.gamespot.com/ps/puzzle/vibribbon/printabte 2550100.html. Retrieved on Jun. 14, 2012. 9 pages.
Vib-Ribbon. Retrieved from the Internet: www.ncsxshop.com/cgi-bin/shop/SCPS-45469.html. Retrieved on Feb. 22, 2005. 1 page.
Video MJ the Experience Kinect: announce—Oct. 2010: (http://www.youtube.com/watch?v=xLbiPicuOMM).
Video "Dance Online-Dance lessons gameplay" <http://www.youtube.com/watch?v=B4phOjfVNLk>. Last accessed on Nov. 8, 2012.
Video <http://www.bing.com/videos/search?q=dance+instruction+game&mid=E69356CFA1B6719FF5C8E69356CFA1B6719FF5C8&view=detail&FORM=VIRE5> (uploaded Jul. 27, 2010).
Video Alvin and The Chipmunks Chipwrecked—Majesco Sales: release—Nov. 2011 (http://www.youtube.com/watch?v=xKeW3CUt14A&feature=related).
Video Dream Dance & Cheer (Released Sep. 13, 2009 for Wii) <http://www.youtube.com/watch?v=oi9vQjT1x5Q>.
Video Just Dance—Ubisoft Paris; <http://www.youtube.com/watch?v=t7f22xQCEpY>; (Nov. 17, 2009).
Video Just Dance 2—Ubisoft; <http://www.youtube.com/watch?v=kpaW9sM_M2Q> (Oct. 12, 2010).
Video Just Dance 2: Oct. 2010 (http://youtu.be/2ChliUgqLtw).
Video Just Dance: Nov. 2009 (http://youtu.be/rgBo-JnwYBw).
Video Kidz Bop Dance Party! The Video Game (Released Sep. 14, 2010 on Wii) <http://www.youtube.com/watch?v=I8VD9EvFdeM>.
Video Let's Cheer—Take 2 Interactive: release—Nov. 2011; announce—Jun. 2011 (http://www.youtube.com/watch?v=uv1IMBIw2Dw&feature=related).
Video Michael Jackson: The Experience—Ubisoft, Ubisoft Paris, Ubisoft Montpelier; <http://www.youtube.com/watch?v=AS3-SuYhSBk>. Date not available.
Video MJ—Paris Week game demo—Oct. 29, 2010 http://www.dailymotion.com/video/xfg4oe_pgw-10-michael-jackson-experiencekinect_videogames?start=13#from=embed <http://www.dailymotion.com/video/xfg4oe_pgw-10-michael-jackson-experience-kinect_videogames?start=13>.
Video MJ the Experience Wii: Nov. 2010 (http://www.youtube.com/watch?v=8ZA59JY8Y_w).
Video MJ:TE Kinect from Aug. 19, 2010 at <http://www.youtube.com/watch?v=6AjGmSnN6gQ>; Michael Jackson The Experience Video Game—Kinect for Xbox 360—Gamescom 2010 HD.
Video MJ:TE on Wii (Nov. 2010); <http://www.youtube.com/watch?v=gmINANGWxgvo>.
Video N.Y. Comic Con '10—Billie Jean Gameplay Demo: <http://www.gametrailers.com/video/nycc-10-michael-jackson/706056>. (Oct. 13, 2010).
Video Tokyo Game Show '10—'Every Step' Trailer: http://www.gametrailers.com/video/tgs-10-michael-jackson/704548 (Sep. 15, 2010).
Video Victorious: Time to Shine—D3 publishers: Dec. 22, 2011 (http://www.youtube.com/watch?v=ud690K02KGg&feature=fyst).
Video We Cheer 2 (Released Nov. 3, 2009 for Wii) <http://www.youtube.com/watch?v=-4oalxqnbll>.
Video MJ the Experience Kinect: release Apr. 2011, http//www.youtube.com/watch?v=N7oyxH I P48A.
Video 'Ghosts' Gameplay Trailer: <http://www.gametrailers.com/video/ghosts-gameplay-michaeljackson/ 706825> _(Oct. 27, 2010).
Video <http://www.bing.com/videos/search?q=dance+instruction+game&mid=E69356CFA 1B6719FF 5C8E69356CFA1B6719FF5C8&view=detaii&FORM=VIRE5> (uploaded Jul. 27, 2010).
Video Britney's Dance Beat (Released May 8, 2002 for PS2); <http://www.youtube.com/watch?v=-KR 1 dR GNX w>.
Video Dance Dance Revolution: Hottest Party 3 (Released Sep. 27, 2009 for Wii) <http://www.youtube.com/watch?v=zk2OhEzGmUY>.
Video Dance on Broadway-Ubisoft, Longtail Studios; <http://www.youtube.comiwatch?v='eYaPdT4z-M>: (Jun. 6, 201Q}_.
Video Dance on Broadway: Jun. 2010 (<http://youtute/Wi9Y51HHcvtY>).
Video Dance Summit 2001: Bust A Groove (Released Nov. 2, 2000 for PS2); <http://www.youtube.com/watch?v=E8NTGHYQcM>.
Video Dancing With the Stars—Activision, Zoe Mode; <http://www.youtube.com/watch?v=C7zBVfEJO~:gp (Oct. 2007).
Video Dancing with the Stars: Oct. 2007 (http://www.youtube.com/watch?v=8UChG2v5DI).
Video Dancing with the Stars: We Dance-Activision, Zoe Mode; <http://www.youtube.com/watch?v=31GOb-CT8vs> (Oct. 2008).
Video DDR Hottest Party; <http://www.youtube.com/watch?v=zk20hEzGmUY> (Sep. 2007).
Video Don't Stop' Gameplay Trailer: <http://www.gametrailers.com/video/dont-stop-michaeljackson/707336> (Nov. 10, 2010).
Video Dream Dance & Cheer (Released Sep. 13, 2009 for Wii) <http://www.youtube.com/watch?v=oi9vaT1x5Q>.
Video E3 2010 Live Demo <http://www.gametrailers.com/video/e3-201 0-michael-jackson/101449>; (Jun. 14, 2010).
Video Eyetoy Groove for PS2; <http://www.youtube.com/watch?v=c80aaOU fuE> (A(2ri12004).

(56) References Cited

OTHER PUBLICATIONS

Video Gamescom '1 0—Billie Jean Demo <http:/iwww.aarnetraiiHrs.corn/video/gc-1 Q..Michael-Jackson/703294>: 1:58-1 :13) (date not available).
Video Gamescom '10-Working Day and Night Demo <http://www.gametrailers.com/video/gc10-michael-jackson/703295> (Aug. 20, 2010).
Video Grease Dance—505 Games: release—Oct. 2011 Wii); http://www.youtube.com/watch?v=PaGBHSB2urg).
Video Hannah Montana: Spotlight World Tour (Released Nov. 6, 2007 for Wii); <http://www.youtube.com/watch?v=WtyuU2NaL3Q>.
Virginia Tech Multimedia Music Dictionary: "P: Phrase" Virginia Tech University, http://www.music.vt.edu/musicdictionary/textp/Phrase.html. Retrieved May 25, 2011 (7 pages).
Marracini, L., "You can teach yourself Flamenco Guitar," Google Books, Paul, Hastings, Janofsky & Walker LLP, 1 pg. (1995).
Prown et al., "Gear secrets of the guitar legends: how to sound like your favorite players," Google Books, Paul, Hastings, Janofsky & Walker LLP, 1 pg. (2003).
Daytona USA Sega Arcade game, 2 pgs. (Available in and around 1994).
Guitar Hero Manual, RedOctane Inc., 18 pages (2005).
#11: First Amended Complaint for Patent Infringement with Demand for Jury Trial by Harmonix Music Systems, Inc. et al. (Civil Action No. 1:09-cv-10206-RWZ), 4 pages (Entered: Mar. 6, 2009).
#12: *Konami Digital Entertainment, Inc. 's* ANSWER to Amended Complaint and Related Counterclaims (Civil Action No. 1:09-cv-10206-RWZ), 9 pages (Entered: Mar. 25, 2009).
#26: Reply to Konami Digital Entertainment, Inc.'s Counterclaims by Harmonix Music Systems, Inc. et al. (Civil Action No. 1:09-cv-10206-RWZ), 5 pages (Entered: Apr. 23, 2009).
#31: *Konami Digital Entertainment Co., Ltd.'s* ANSWER to Amended Complaint and Related Counterclaims (Civil Action No. 1:09-cv-10206-RWZ), 10 pages (Entered: Jul. 14, 2009).
#32: Reply to Konami Digital Entertainment Co., Ltd.'s Counterclaims by Harmonix Music Systems, Inc. et al. (Civil Action No. 1:09-cv-10206-RWZ), 6 pages (Entered: Aug. 3, 2009).
#53: Preliminary Joint Claim Construction Chart by Plaintiffs Harmonix Music Systems, Inc. and Viacom, Inc. and Defendants Konami Digital Entertainment Co., Ltd. and Konami Digital Entertainment, Inc. (Civil Action No. 1:09-cv-10206-RWZ), 8 pages (Entered: Nov. 12, 2009).
#59: Joint Stipulation of Dismissal with Prejudice by Plaintiffs Harmonix Music Systems, Inc. and Viacom, Inc. and Defendants Konami Digital Entertainment Co., Ltd. and Konami Digital Entertainment, Inc. (Civil Action No. 1:09-cv10206-RWZ), 3 pages (Entered: Sep. 16, 2009).
Defendants and Counterclaimants Konami Digital Entertainment Co., Ltd.' s and Konami Digital Entertainment, Inc.'s Invalidity Contentions with Jury Trial Demanded and Exhibits 1-8 (Civil Action No. 1:09-cv-10206-RWZ), 76 pages (Entered: Aug. 21, 2009).
Taiko Drum Master Game Manual, Namco Ltd. For PlayStation 2 (Oct. 25, 2004, 18 pages).
Konami Corporation, The computer game "Dance Dance Revolution Max", released in the US by Konami corporation on Oct. 29, 2002, as evidenced by the game manual (2 pgs.).

* cited by examiner

PROVIDING REALISTIC INTERACTION TO A PLAYER OF A MUSIC-BASED VIDEO GAME

RELATED APPLICATIONS

This application is a continuation of U.S. Ser. No. 11/683,136, filed on Mar. 7, 2007, now U.S. Pat. No. 7,459,624, which claims the benefit of priority to U.S. provisional application Ser. No. 60/743,938 filed on Mar. 29, 2006 and titled GAME CONTROLLER SIMULATING A GUITAR, the entire contents of which are incorporated herein by reference in their entirety.

FIELD OF THE INVENTION

This invention relates to video game controllers and, more particularly, to video game controllers that emulate a musical instrument to provide game input.

BACKGROUND OF THE INVENTION

"Rhythm-action" is a popular video game genre which requires a player to perform phrases from a pre-recorded musical composition using the video game's input device. One of the best-known examples of this genre is the BEATMANIA series of games published by Konami Co. Ltd. of Japan. In this series of games the notes in musical phrases are graphically displayed to the player as a series of visual markers spaced along one or more timelines; each marker corresponds to one note in the phrase. In the block diagram environment shown in FIG. 1, visual markers 104 move from the top of the display to the bottom of the display. As each marker on the scrolling timelines 110, 120, 130, 140 passes a graphical cursor 108 displayed along this timeline, the player must simultaneously press a button on an input device (not shown) corresponding to the correct timeline to play the sound of the corresponding note at the correct time. If the player performs this action successfully for a sufficient percentage of the notes, he scores well and wins the game. If the player fails to perform this action successfully for a sufficient percentage of the notes, he scores poorly and loses the game. As shown in FIG. 1, two or more players may compete against each other, typically by each one attempting to play back different, parallel musical phrases from the same song simultaneously. The player who plays the highest percentage of notes correctly achieves the highest score and wins.

It is known, in the context of some rhythm-action games, to provide game controllers simulating musical instruments that allow players to fully use both their right and left hand to provide game input. It would be desirable to provide a game controller that closely mimics the instrument which the controller simulates in such a way that the physical instrument features mimicked by the controller affect gameplay.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

Figure 1:
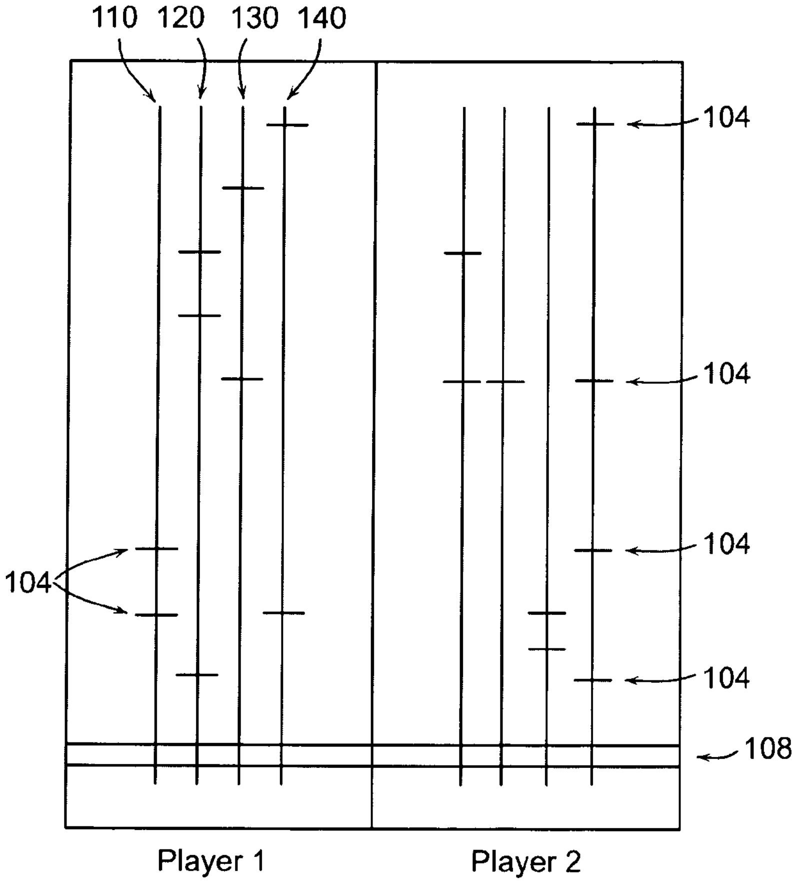
(PRIOR ART) FIG. 1
FIG. 1 is a block diagram depiction of one embodiment of a rhythm-action game environment.

A controller simulating a musical instrument may be used with a variety of gaming platforms, such as: PLAYSTATION2, PLAYSTATION3, or PLAYSTATION PERSONAL, manufactured by Sony Corporation; DREAMCAST, manufactured by Sega Corp.; GAMECUBE, GAMEBOY, GAMEBOY ADVANCE, or WII, manufactured by Nintendo Corp.; or XBOX or XBOX360, manufactured by Microsoft Corp. In other embodiments, the simulated guitar musical controller may be used with a gaming platform comprising a personal computer, personal digital assistant, or cellular telephone.

Although described below in connection with a simulated guitar controller, the game controller may simulate any of a wide variety of musical instruments such as percussion instruments (including cymbals, bell lyre, celeste, chimes, crotales, glockenspiel, marimba, orchestra bells, steel drums, timpani, vibraphone, xylophone, bass drum, crash cymbal, gong, suspended cymbal, tam-tam, tenor drum, tom-tom, acme siren, bird whistle, boat whistle, finger cymbals, flex-a-tone, mouth organ, marching machine, police whistle, ratchet, rattle, sandpaper blocks, slapstick, sleigh bells, tambourine, temple blocks, thunder machine, train whistle, triangle, vibra-slap, wind machine, wood block, agogo bells, bongo drum, cabaca, castanets, claves, conga, cowbell, maracas, scraper, timbales, kick drum, hi-hat, ride cymbal, sizzle cymbal, snare drum, and splash cymbal), wind instruments (including piccolo, alto flute, bass flute, contra-alto flute, contrabass flute, subcontrabass flute, double contrabass flute, piccolo clarinet, sopranino clarinet, soprano clarinet, basset horn, alto clarinet, bass clarinet, contra-alto clarinet, contrabass clarinet, octocontra-alto clarinet, octocontrabass clarinet, saxonette, soprillo, sopranino saxophone, soprano saxophone, conn-o-sax, clar-o-sax, saxie, mezzo-soprano saxophone, alto saxophone, tenor saxophone, baritone saxophone, bass saxophone, contrabass saxophone, subcontrabass saxophone, tubax, aulochrome, tarogato, folgerphone, contrabassoon, tenoroon, piccolo oboe, oboe d'amore, English horn, French horn, oboe de caccia, bass oboe, baritone oboe, contrabass oboe, bagpipes, bugle, comet, didgeridoo, euphonium, flugelhom, shofar, sousaphone trombone, trumpet, tuba, accordion, concertina, harmonica, harmonium, pipe organ, voice, bullroarer, lasso d'amore, whip and siren), other stringed instruments (including harps, dulcimer, archlute, arpeggione, banjo, cello, Chapman stick, cittern, clavichord, double bass, fiddle, slide guitar, steel guitar, harpsichord hurdy gurdy, kora, koto, lute, lyre, mandola, mandolin, sitar, ukulele, viola, violin, and zither) and keyboard instruments (including accordion, bandoneon, calliope, carillon, celesta, clavichord, glasschord, harpsichord, electronic organ, Hammond organ, pipe organ, MIDI keyboard, baby grand piano, electric piano, grand piano, janko piano, toy piano, upright piano, viola organista, and spinets).

Game controllers simulating any of the instruments above may provide a note-producing mechanism different from that usually associated with the simulated instrument. For example, a simulated keyboard controller may include, in addition to key as one would expect on a keyboard, a pitch bend wheel or an associated effects pedal as a secondary note-producing mechanism. Simulated woodwind instruments may include "mutes," such as cup mutes, straight mutes, wah-wah mutes, plunger mutes, bucket mutes, or hat mutes. A simulated microphone may include an effects pedal as a secondary note producing mechanism.

Figure 2:
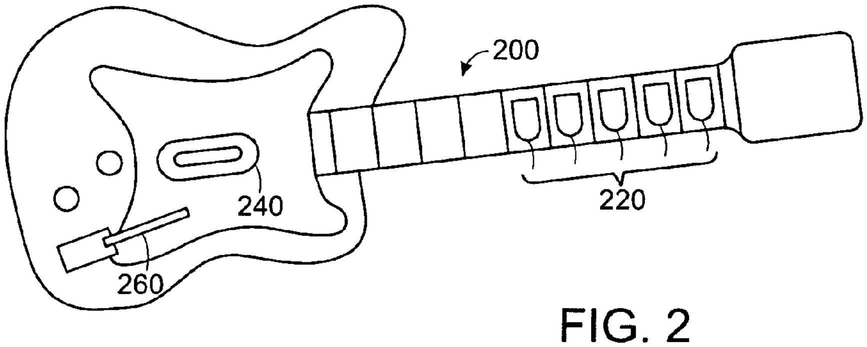
FIG. 2 is a configuration diagram of one embodiment of a guitar controller.

Referring now to FIG. 2, an embodiment of a simulated guitar controller 200 for use with a video game is shown. The simulated guitar controller 200 is provided with fret buttons 220. Although five fret buttons are shown in FIG. 2, any number of fret buttons 220 may be provided by the controller 200. The simulated guitar controller also includes a "strum bar" 240. In order to successfully "play" a game event, the player holds down one or more of the fret buttons 220 while simultaneously strumming the strum bar 240, in much the same way that one would play a guitar. In some embodiments players may also execute "hammer-ons" and "pull-offs," as described below, which allow a player to "play" a game event by pressing or releasing only a fret button 220.

Figure 2A:
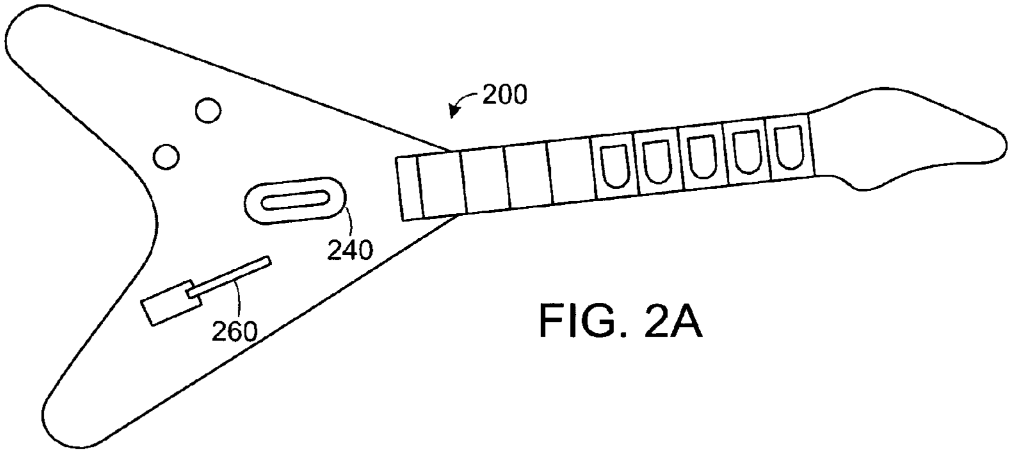
FIG. 2A is a configuration diagram of another embodiment of a guitar controller.
Figure 2B:
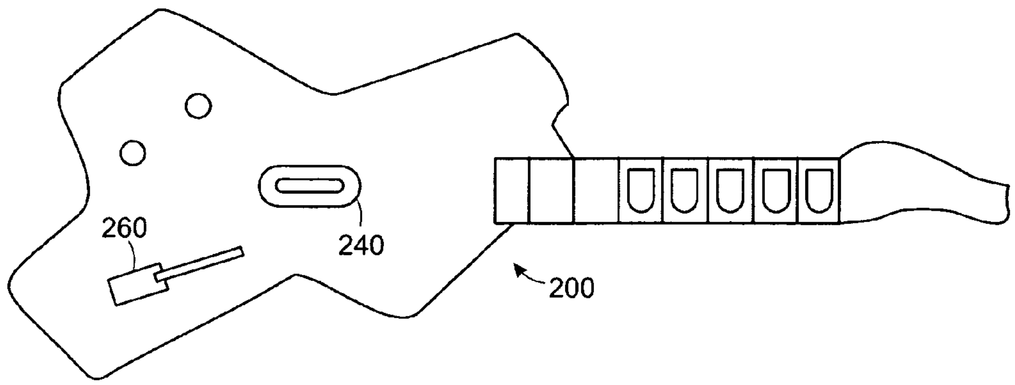
FIG. 2B is a configuration diagram of another embodiment of a guitar controller.

FIGS. 2A and 2B depict alternate embodiments of the guitar controller of FIG. 2. FIG. 2A depicts an embodiment of the guitar controller intended to simulate a guitar model by Gibson known as the "Flying V." FIG. 2B depicts an embodiment of the guitar controller intended to simulate a guitar model known as the "Moderne." Any other body styling may be provided. For example, in some embodiments, the body portion of the guitar controller simulates a Gibson Blueshawk, Gibson Byrdland, Gibson Chet Atkins SST, Gibson Citation, Gibson Corvus, Gibson Digital, Gibson ES-120, Gibson ES-125, Gibson ES-135, Gibson ES-137, Gibson ES-150, Gibson ES-165, Gibson ES-175, Gibson ES-225, Gibson ES-295, Gibson ES-330, Gibson ES-335, Gibson ES-335 "Lucille", Gibson ES-345, Gibson ES-347, Gibson ES-355, Gibson EDS-1275, Gibson Explorer (also known as the X-plorer), Gibson Firebird, Gibson Futura, Gibson Howard Roberts Fusion, Gibson Invader, Gibson L4-CES, Gibson L5, Gibson L5S, Gibson L6-S, Gibson Les Paul, Gibson Les Paul Black Beauty, Gibson Les Paul Custom Anniversay 25/50, Gibson Les Paul Junior, Gibson Les Paul Studio, Gibson Les Paul Swamp Ash Studio, Gibson Les Paul Recording, Gibson Les Paul 23, Gibson Les Paul 432, Gibson (Les Paul) "The Paul" Deluxe (which has a cutaway SG body), Gibson (Les Paul) "The Paul" Deluxe Firebrand (which is characterized in having a cutaway SG body with firebranded Gibson logo), Gibson Marauder, Gibson Melody Maker, Gibson Nighthawk, Gibson RD, Gibson S-1, Gibson SG, Gibson SG Special, Gibson SG Supreme, Gibson Sonex, Gibson Super 400, Gibson MIII, Gibson Advanced Jumbo, Gibson Blues King, Gibson B12-45 12 string, Gibson C-165 Maple, Gibson C-165 Rosewood, Gibson Hummingbird, Gibson Hummingbird Custom, Gibson Dove, Gibson Dove Artist Model, Gibson Doves In Flight Custom, Gibson J-160 E VS Std, Gibson J-180, Gibson J-185, Gibson J-185 EC, Gibson J-185 EC Rosewood, Gibson J-185 EC Cutaway, Gibson J-90 Super Fusion, Gibson J-45, Gibson J-45 Deluxe, Gibson J-45 Rosewood, Gibson J-45 Custom Vine, Gibson J-50, Gibson L-00, Gibson L-130, Gibson L-140, Gibson L-150 Custom, Gibson LC-1 Cascade, Gibson LC-2 Sonoma, Gibson J-100, Gibson Nick Lucas Reissue, Gibson Nick Lucas Elite, Gibson J-150 Maple, Gibson J-200, Gibson J-200 EC, Gibson SJ-200 Western Classic, Gibson J-200 Custom Vine, Gibson J-250 Monarch, Gibson J-2000, Gibson Super 200 Cutaway Custom, Gibson SJ-300 Rosewood, Gibson Sheryl Crow Signature Model, Gibson Songwriter Deluxe, Gibson Songwriter Deluxe Cutaway, Gibson Songwriter Deluxe 12 String, Gibson Southern Jumbo, Gibson Traveling Songwriter, Fender Broadcaster, Fender Bullet, Fender Cyclone, Fender Duo-Sonic, Fender Electric XII, Fender Jaguar, lender Jag-stang, Fender Jazzmaster, Fender Katana, Fender Contemporary Stratocaster Japan, Fender Lead Series, Fender EFD, Fender Musicmaster, Fender Mustang, Fender Prodigy, Fender Performer, Fender Showmaster, Fender Starcaster, Fender Stratocaster, Stratocaster XII, Fat Strat, Fender Telecaster, Fender Telecaster Custom, Fender Telecaster Deluxe, J5 Telecaster, Fender Telecaster Squire, Fender Toronado, Fender Swinger, Fender Bronco, or Fender Custom.

The body portion of the guitar may simulate bass guitars, such as the Gibson EB-0, Gibson EB-1, Gibson EB-2, Gibson EB-3, Gibson EB-6, Gibson RD bass, Gibson Thunderbird, Gibson Ripper, Gibson Grabber, Gibson G3, Gibson Victory Standard bass, Gibson Les Paul bass, Fender Jazz Bass, Fender Jaguar Bass, Fender Mustang Bass, Fender Precision Bass, Fender Performer Bass, Fender Telecaster Bass, Fender VI, Fender Zone Bass, Fender Dimension Bass, Fender Bass V, Fender Bronco Bass, or Fender Bullet Bass.

Figure 2C:
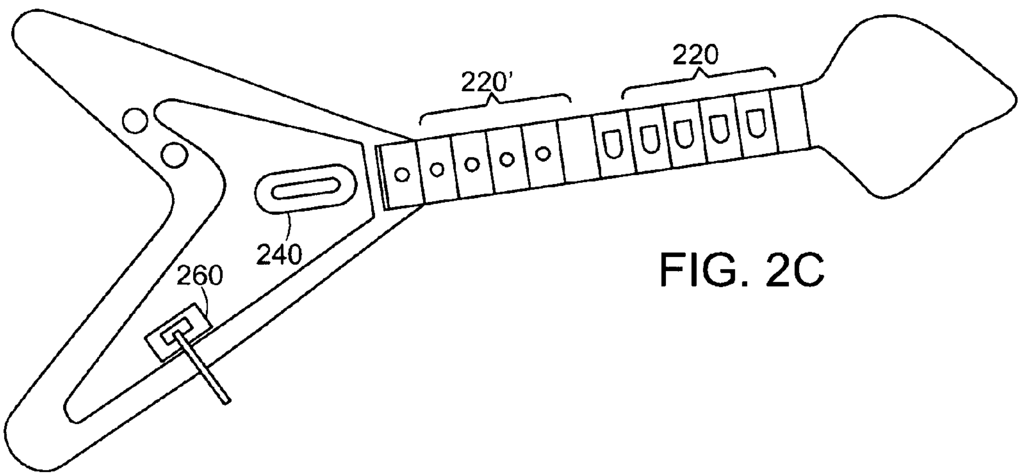
FIG. 2C is a configuration diagram of yet another embodiment of a guitar controller having two sets of fret buttons disposed on the neck of the guitar.

FIG. 2C depicts another alternate embodiment of the guitar controller having two sets of fret buttons 220, 220'. As shown in FIG. 2C a second set of fret buttons 220' is disposed on the "neck" of the guitar proximal to the guitar body, i.e. in between the first set of fret buttons 220 and the guitar body. In some embodiments, the ordering of the second set of fret buttons 220' is the same as the first set of fret buttons 220; that is, if the first set of fret buttons 220 are colored, beginning at the "head" of the guitar neck and moving toward the body, green, red, yellow, blue, orange, then the second set of fret buttons 220' have the same coloring as one continues down the neck toward the guitar body. Although shown in FIG. 2C as round buttons, fret buttons 220' may be any shape or size, including the same shape and size of the first set of fret buttons 220.

Moreover, the second set of fret buttons 220' may be positioned on the neck portion of the guitar controller such that respective ones of the first set of fret buttons and corresponding ones of the second set of fret buttons are positioned on the same fret of the neck (i.e. a red fret button of the first set of buttons 220 and a red fret button of the second set of fret buttons 220' are located near each other on the same "fret" of the neck portion of the guitar controller). In specific ones of these embodiments, fret buttons are physically connected to a toggle switch which allows a single physical button to provide two fret buttons, one associated with a first set of fret buttons and one provided with a second set of fret buttons. In further embodiments, respective ones of the first set of fret buttons 220 and corresponding ones of the second set of fret buttons 220' are electrically connected, e.g. wired together, so that activation of either one of the respective fret buttons is identified by the controller as activation of the fret button, regardless of whether the fret button from the first set of fret buttons 220, the fret button from the second set of fret buttons 220', or both, are activated. In still other embodiments, the respective ones of the fret buttons are not wired together, that is, the controller can distinguish between activation of fret buttons in one set versus activation of fret button in another set.

In some of these latter embodiments, the second set of fret buttons 220' may be used for playing "solos" during gameplay. Use of the guitar controller in this manner provides a player with a more realistic gameplay experience, since guitar solos are often played very close to the body of the guitar. In some embodiments, the second set of fret buttons 220; may be the only set of fret buttons on which hammer-ons and pull-offs may be executed, as described below. In other embodiments, the second set of fret buttons 220' may be used to trigger specific guitar effects, such as pick slides, screeches, or feedback. Alternatively, "performing" using the second set of fret buttons may alter game graphics (such as venue animation, venue lighting, crowd animation, brightness, avatar animation, game cue sustain tail, game cue brightness, game cue sustain tail brightness, game cue size, game cue shape, game cue sustain tail pulsation, and game cue sustain tail size), sound quality, or other gameplay characteristics, such as character health, character wealth in the game, the player's score, or in-game "powerups."

Referring back to any one of FIGS. 2, 2A, 2B and 2C, the simulated guitar controller 200 also includes a vibrato bar 260, also known to guitar players as a tremolo bar or "whammy bar." The vibrato bar 260, for convenience, will be referred to throughout the remainder of this document as a "whammy bar" The whammy bar 260, as will be described below, may be used to alter the frequency, pitch, volume, sound quality, distortion, simulated feedback sound, or any other attribute of the current note or chord being played by the player.

Figure 2D:
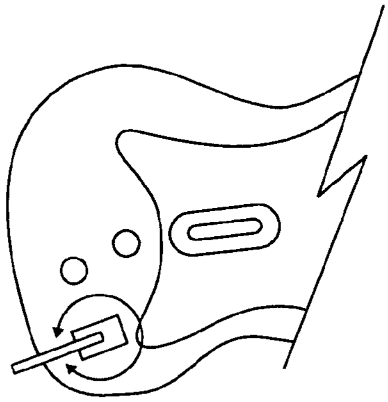
FIG. 2D is a configuration diagram of another embodiment of a guitar controller having a whammy bar in a first position.
Figure 2E:
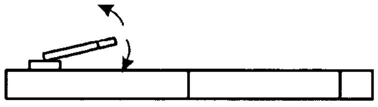
FIG. 2E is a side view diagram of an embodiment of a game controller simulating a guitar that includes a whammy bar.

The whammy bar 260 of the controller resembles a whammy bar of a real guitar. As shown in FIG. 2D, and with comparison to FIG. 2B, the whammy bar 260 can be rotated to any one of a number of positions for the convenience of the player. As shown in FIG. 2D, the whammy bar 260 has been rotated to a position that places it out of the way of the player's strumming hand. In some embodiments, the whammy bar 260 is spring-loaded, like the whammy bar of a real guitar. In these embodiments, as depicted by FIG. 2E, the whammy bar 260 can be pushed down or pulled up to affect the played note. When released, it settles back to its default, neutral position.

The whammy bar is typically manipulated by the guitarist's strumming hand, that is, the hand with which the player operates the strum bar 240. In a real guitar, manipulating the whammy bar directly affects the tension of the guitar strings, and therefore causes the pitch of the vibrating strings to rise and fall as the bar is pulled or pushed. The simulated whammy bar of the guitar controller, the vibrato bar, can be used as a continuous controlling actuator, much like a joystick. Typically, the vibrato bar has a single degree-of-freedom, but it may have more degrees of freedom. It may additionally be used as an on-off switch, instead of a continuous controller. The whammy bar 260 of the controller looks and feels like the whammy bar of a real guitar, and, therefore provides a much more enjoyable gaming experience for the player.

The guitar controller 200 also allows a player to use more sophisticated guitar playing techniques to interact with a game. Two such techniques are "hammer-ons" and "pull-offs." Hammer-ons and pull-offs allow a guitarist to player notes in rapid succession. Typically, they only require the use of the player's fretting hand. To play a hammer-on note, the guitarist uses one of the free fingers of his fretting hand to strike the guitar string with high velocity. This results in the string vibrating due to the force of the string hitting a fret. As a result, the string need not be strummed by the strumming hand. Pull-offs require the guitarist to tug slightly on the string when he releases it from a fret. This pulling action also causes the string to vibrate more, again, eliminating the need to strum the string with the strumming hand.

In the simulated guitar controller 200, hammer-ons may be simulated by allowing the player to press down fret buttons 220 without needing to simultaneously strum the strum bar 240. In one embodiment, this is achieved by the manufacturer of the game identifying a note as amenable to hammering on or pulling off. In other embodiments, notes are identified as amenable to hammering on or pulling off automatically based on timing information between notes. For a hammer-on, a player will generally need to first capture a "lower" pitched note traditionally, that is, by holding down a fret button and simultaneously activating the strum bar. If the next note is identified as amenable to being played by a hammer-on technique, the player need only activate the "higher" pitched fret button to successfully capture the note.

Similarly, in pull-offs, the player can "play a note" by releasing a fret button 220 without needing to simultaneously strum the strum bar 240. This is achieved, again, by the manufacturer of the game identifying a note as a note as amenable to hammering on or pulling off in any of the ways described above. For a pull-off, a player will generally need to first capture a note in the fashion described above, that is, by holding down a fret button and simultaneously activating the strum bar. If the next note is identified as amenable to being played by a pull-off technique, the player need only release a "higher" pitched fret button to successfully capture the note. A player may pull-off or hammer-on multiple notes in succession, if the series of notes to be placed are all identified as amenable to hammering on or pulling off. For example, a note series may contain a 3$^{rd}$ fret note, followed by a 4$^{th}$ fret note, followed by a 3$^{rd}$ fret note, followed by a 4$^{th}$ fret note, etc. The player may capture the first note and then play a series of alternating hammer-ones and pull-offs to capture the remaining notes in the series. In some embodiments, the two notes are not required to be immediately next to one another on the guitar neck. Alternatively, a player may play a series of hammer-ons uninterrupted by a pull-off, for example, by striking buttons associated with successively higher-pitched notes. As discussed above, when using the embodiment of a guitar controller 200 depicted in FIG. 2C, the second set of fret buttons may be used to perform hammer-ons and pull-offs.

In either of these embodiments, notes that may be played using a hammer-on or pull-off technique may be visually indicated to the player. In some embodiments, these notes may be identified by changing their geometric shape or making them appear larger or smaller than normal notes. In other embodiments, these notes may be visually identified by changing the transparency, color, or brightness of the note. In still further embodiments, these notes may be identified by a color pattern on the note, such as a stripe, dot, polka dot, or other visual pattern overlaid on the note. In other embodiments, the a note amenable to being played by a hammer-on or pull-off may be indicated using a different color, for example, instead of orange the gem may have a brown color. In that particular example, it may be said that the second gem appears "dimmer" or "darker" than the first gem.

Figure 2F:
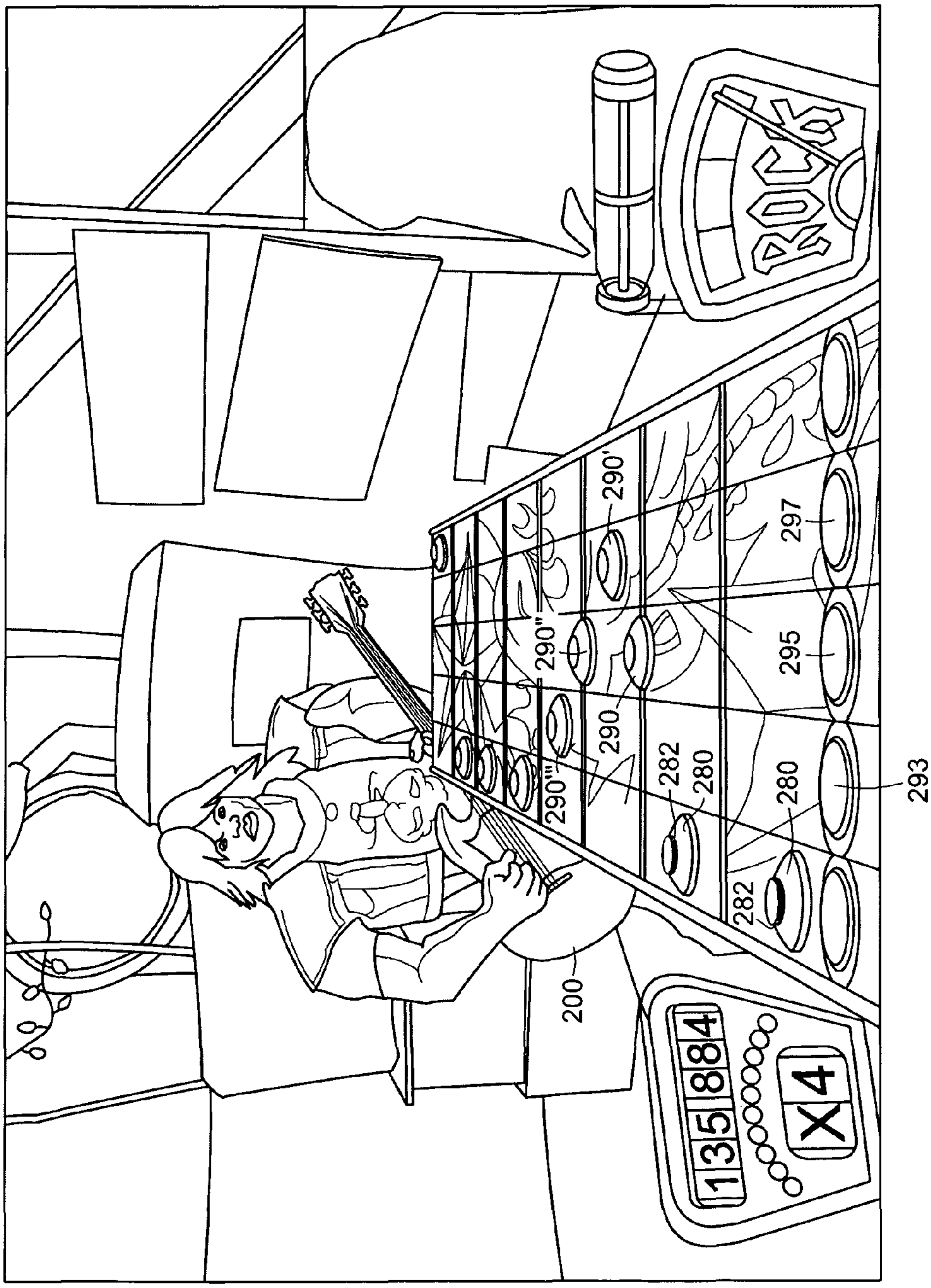
FIG. 2F is a screen shot of an embodiment of a rhythm-action game in which game gems represents notes that may be played by a hammer-on or pull-off technique.

FIG. 2F depicts an embodiment of a rhythm-action game in which notes amenable to performance by a hammer-on or pull-off techniques are indicated visually. As shown in FIG. 2F, notes amenable to performance by pulling-off or hammering-on are indicated by the absence of a ring around the top of the game gem 290. "Normal" notes, that is, notes that are performed by the activation of both a fret button and the strum bar, have a collar 282 surrounding the top of the game gem 280. In the particular embodiment shown in FIG. 2F, the notes 290, 290', 290", 290'" may be performed by the player striking the fret button associated with the target 295 when game gem 290 passes target 295, followed by striking the fret button associated with target 297 when game gem 290' passes the target 297, followed by the release of the fret button associated with target 297 when game gem 290" passes target 295. The note represented by game gem 290'" may be captured either by (1) the player striking the fret button associated with target 293 when the game gem 290'" passes the target 293 or (2) the player releasing the fret button associated with the target 295, provided that the fret button associated with the target 293 is already activated.

Real guitarists often perform flamboyant motions on stage when playing guitar as part of their showmanship. One typical motion involves rotating the guitar vertically so that the neck of the guitar points up, while the body of the guitar is down, usually at waist level. In the simulated guitar controller 200, a mechanical "tilt sensor" can be included that monitors the guitar's physical orientation. This tilt sensor is typically a mercury switch or a ball-bearing switch which acts as a binary actuator, indicating whether the guitar has been rotated into a "neck up" position, or is in the normal playing position. Such tilt sensors have been included in guitar controllers manufactured by Konami and by Red Octane. Other secondary techniques for interacting with the controller include shaking the controller and slapping the controller.

Figure 3:
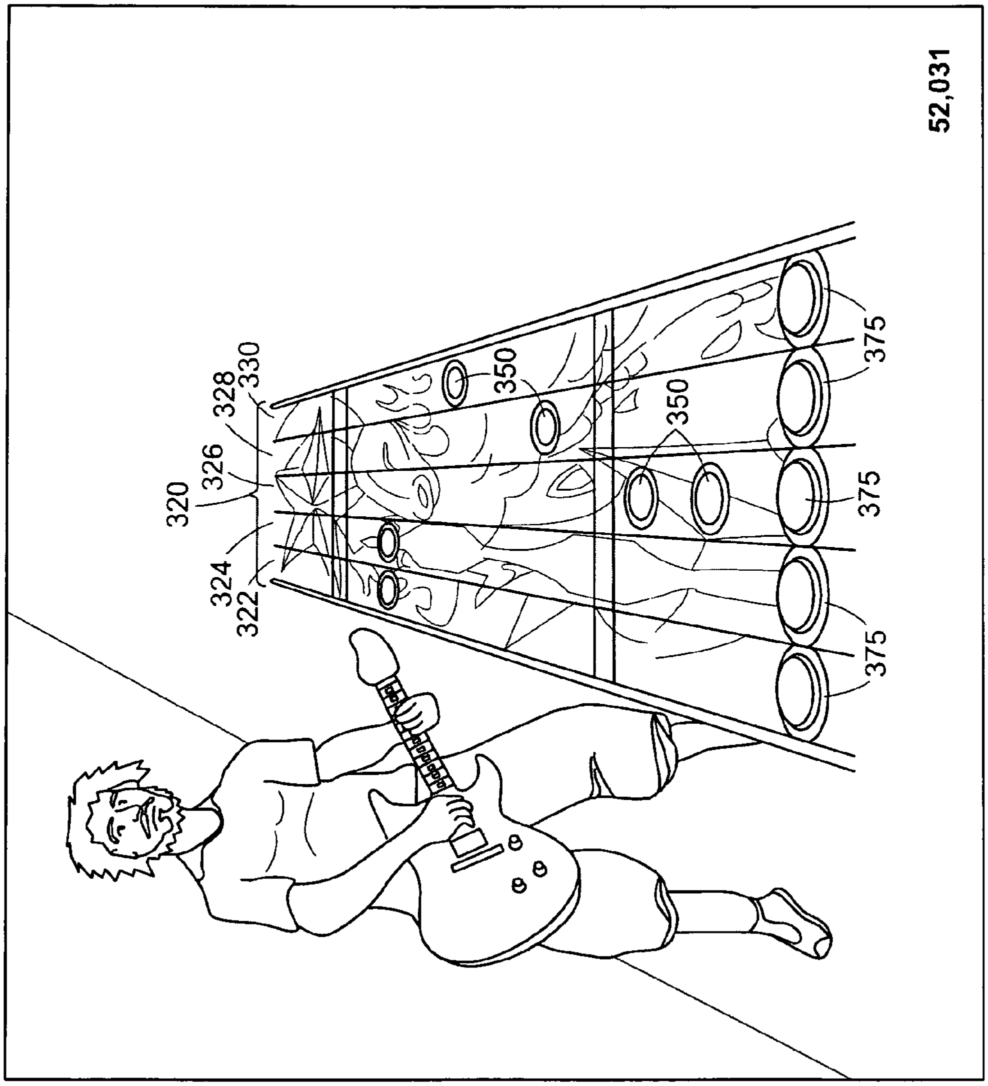
FIG. 3 a screen shot depicting one embodiment of a screen display of a rhythm action game.

Referring now to FIG. 3, one embodiment of a screen shot depicting a rhythm action game in which the simulated musical instrument, such as a simulated guitar controller, can be used is shown. A lane 320 extends to the players. In the embodiment shown in FIG. 3, the lane has five sub lanes 322, 324, 326, 328, 330 which correspond to a respective one of the fret buttons 220 provided on the guitar controller 200. In other embodiments, the number of sublanes does not need to match the number of fret buttons 220 provided by the simulated guitar controller 200. For embodiments in which there are more fret buttons 220 provided than sublanes, a subset of the provided fret buttons 220 may be used to interact with the game. For those embodiments in which there are more sublanes than fret buttons 220, one fret button 220 may be assigned to more than one sublane.

As shown in FIG. 3, each lane may be subdivided into a plurality of segments. Each segment may correspond to some unit of musical time, such as a beat, a plurality of beats, a measure, or a plurality of measures. Although the embodiment shown in FIG. 3 show equally-sized segments, each segment may have a different length depending on the particular musical data to be displayed. In addition to musical data, each segment may be textured or colored to enhance the interactivity of the display.

Referring back to FIG. 3, a sublane may have one or more game "cues", "elements" or "gems" 350 corresponding to musical events distributed along the sublanes. During gameplay, the cues 350 appear to flow toward a game player. The cues 350 are distributed on the sublanes in a manner having some relationship to musical content associated with the game level. For example, the cues may represent note information (gems spaced more closely together for shorter notes and further apart for longer notes, pitch (gems placed on the left side of the lane for notes having lower pitch and the right side of the lane for higher pitch), volume (gems may glow more brightly for louder tones), duration (gems may be "stretched" to represent that a note or tone is sustained), articulation, timbre or any other time-varying aspects of the musical content. Although shown in FIG. 3 as a circular element, the game elements 350 may be any geometric shape, and may have other visual characteristics, such as transparency, color, or variable brightness.

As the game elements 350 move along a respective sublane, musical data represented by the game elements 350 may be substantially simultaneously played as audible music when the player successfully performs the event. To successfully perform an event, a player holds down the fret button 220 corresponding to the sublane on which the game element 350 appears while strumming the strum bar 240. The player must perform this action when the game element 350 passes under the target marker 375. In some embodiments, the player may hold down the corresponding fret button at any point in time before the moment when game element 350 passed under the target marker 375. In other embodiments, the player may successfully perform an event by performing a hammer-on or pull-off when the game element 350 passes under the target marker 375.

In some embodiments, audible music represented by a game element 350 is only played (or only played at full or original fidelity) if a player successfully "performs the musical content" by capturing or properly executing the game element 350. In other embodiments, the audible music represented by a game element 350 is modified, distorted, or otherwise manipulated in response to the player's proficiency in executing game elements associated with a sublane. For example, various digital filters can operate on the audible music prior to being played by the game player. Various parameters of the filters can be dynamically and automatically modified in response the player capturing game elements associated with sublane, allowing the audible music to be degraded if the player performs poorly or enhancing the audible music if the player performs well. For example, if a player fails to execute a game event, the audible music represented by the failed event may be muted, played at less than full volume, or filtered to alter the its sound. In certain embodiments, a "wrong note" sound may be substituted for the music represented by the failed event. Conversely, if a player successfully executes a game event, the audible music may be played normally. In some embodiments, if the player successfully executes several, successive game events, the audible music associated with those events may be enhanced, for example, by adding an echo or "reverb" to the audible music. The filters can be implemented as analog or digital filters in hardware, software, or any combination thereof. Further, application of the filter to the audible music output, which in many embodiments corresponds to musical events represented by game elements 350, can be done dynamically, that is, during play. Alternatively, the musical content may be processed before game play begins. In these embodiments, one or more files representing modified audible output may be created and musical events to output may be selected from an appropriate file responsive to the player's performance.

Figure 3A:
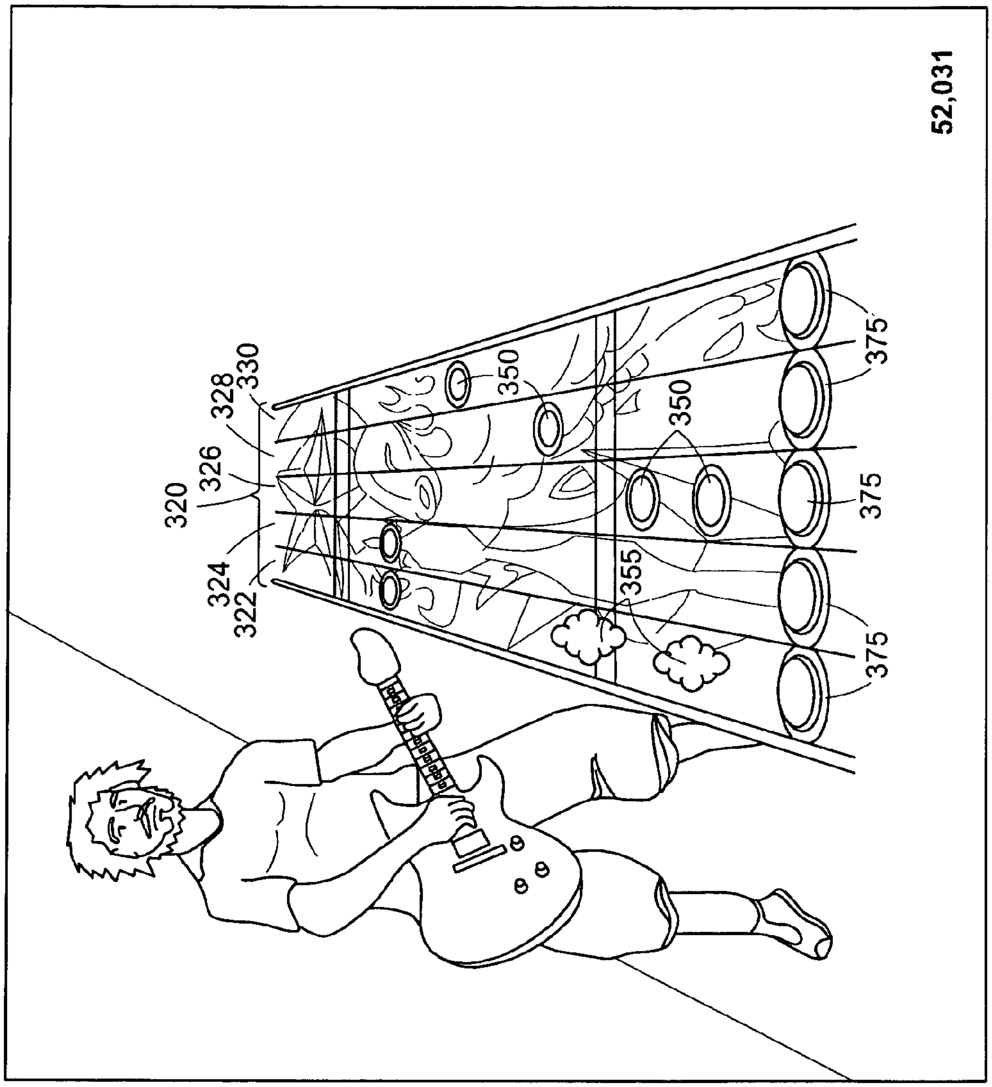
FIG. 3A a screen shot depicting one embodiment of a screen display of a rhythm action game.
Figure 3B:
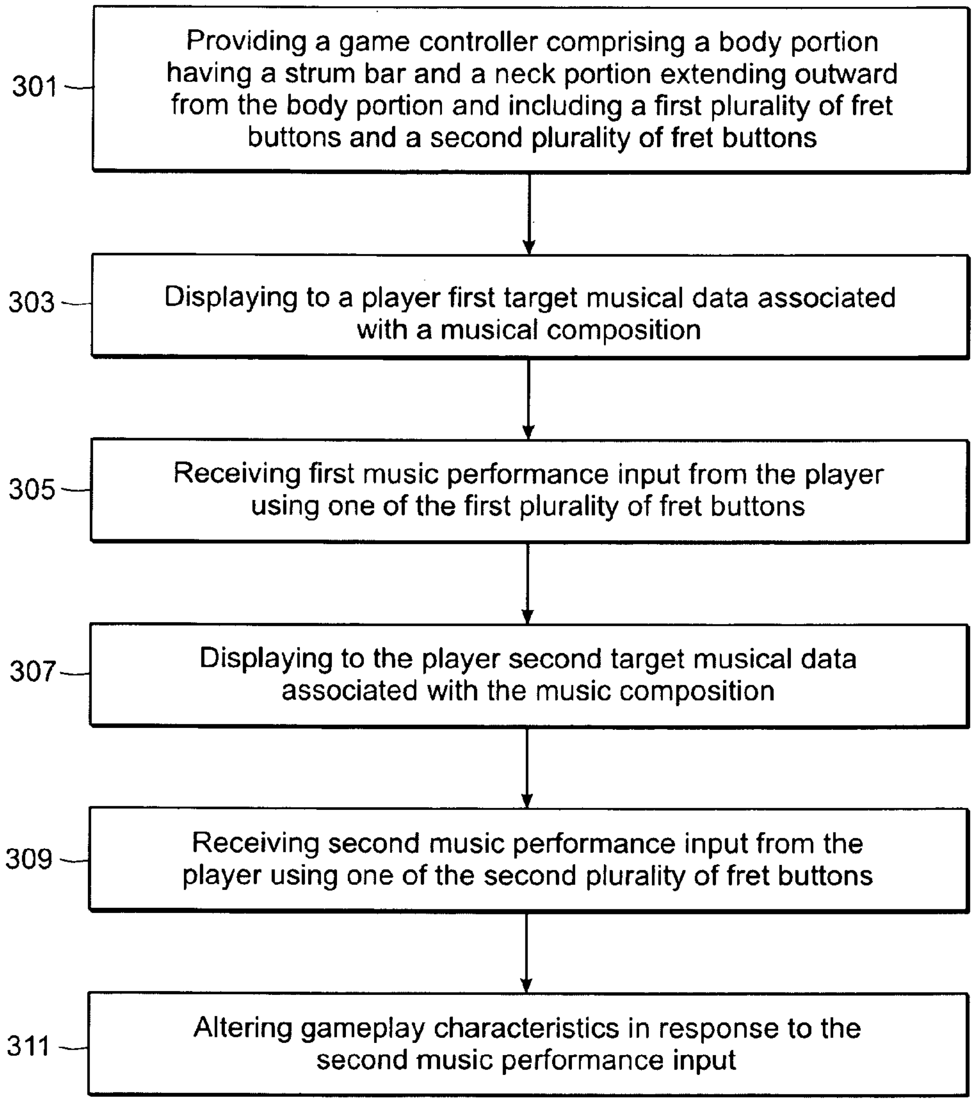

FIG. 3A depicts a screenshot of an embodiment of a rhythm-action game in which a second set of fret buttons is part of gameplay. As shown in FIG. 3A and similar to FIG. 3, cues 350 appear to flow toward a game player. Unlike the embodiment depicted in FIG. 3, a second set of cues 355 are also distributed on the sublanes. The second set of game cues 355 indicate to the player that the second set of fret buttons 220' should be used when performing those game events. In some embodiments, failure to perform those game events on the second set of fret buttons 220' may result in failure. In other embodiments, successfully performing the game events indicated by the second set of game cues 355 may alter game graphics (such as venue animation, venue lighting, crowd animation, brightness, avatar animation, game cue sustain tail, game cue brightness, game cue sustain tail brightness, game cue size, game cue shape, game cue sustain tail pulsation, and game cue sustain tail size), sound quality, or other gameplay characteristics, such as character health, character wealth in the game, the player's score, or in-game "powerups." Although the difference between game cues 350 and 355 is shown in FIG. 3 as geometric shape, the difference may be indicated using any visual characteristics, such as transparency, color, or brightness.

Figure 4:
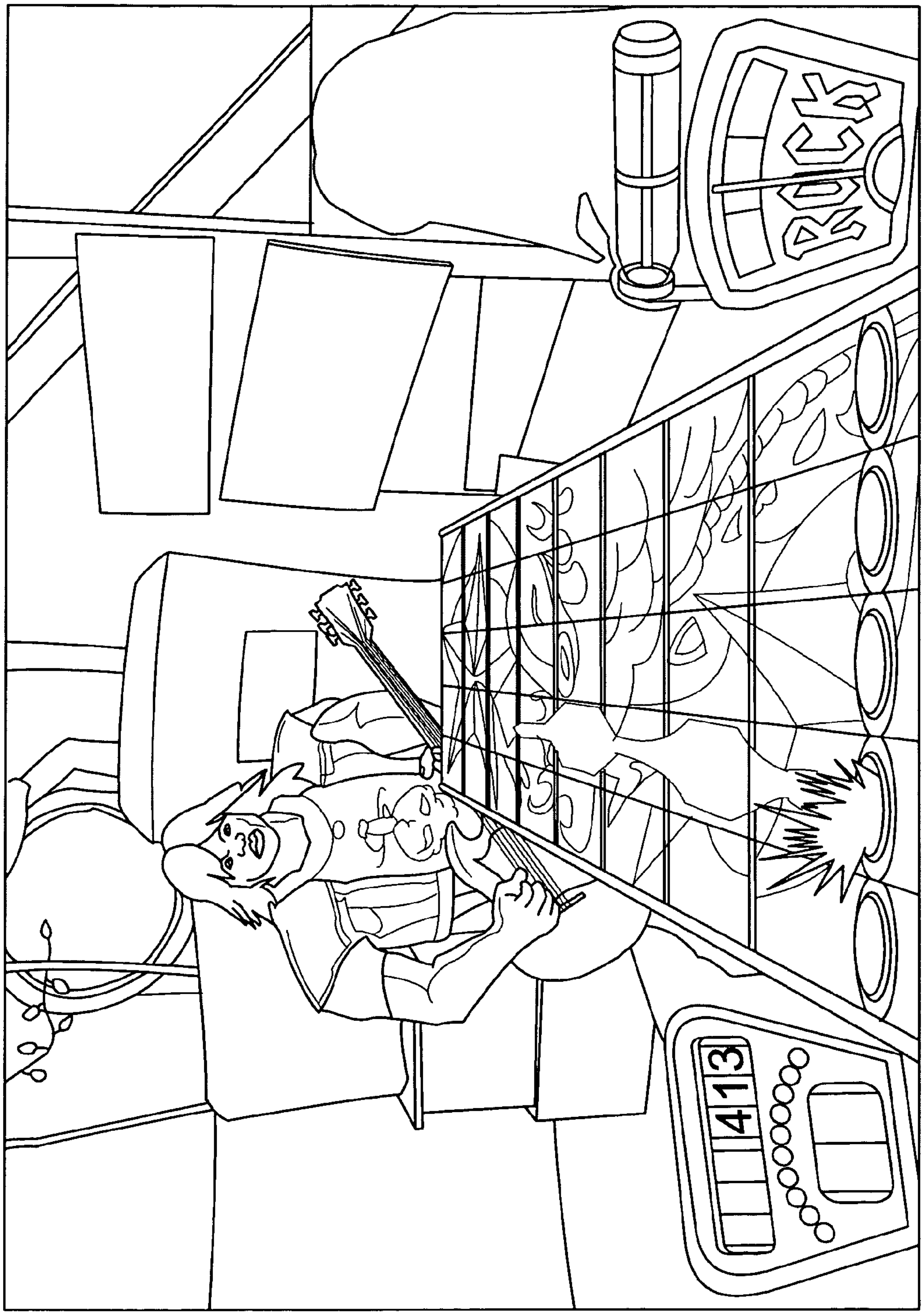
FIG. 4 is a screen shot depicting one embodiment of a screen display in which a player affects gameplay using a guitar controller having a whammy bar.

Referring now to FIG. 4, one embodiment of a screen display showing player interaction using the whammy bar is shown. As described above, successfully activating the correct fret button 220 and strum bar 240 results in performance of a musical event. By activating the whammy bar, the player can alter the certain aspects of the reproduced musical event. For example, pushing or pulling on the whammy bar can change the pitch of a note or chord, the volume of a note or chord, or the sound quality of a note or chord. Activation of the whammy bar may also add effects to the audio such as simulated feedback, flange, fuzz, vocoder, echo, reverb, chorus, and delay. In some embodiments, pushing or pulling the whammy bar can add a feedback audio effect to a note or chord. In other embodiments, pushing or pulling the whammy bar can add a distortion audio effect to the note or chord being held. In addition, the whammy bar can affect sustained notes in addition to short single gems.

As shown in FIG. 4, pushing or pulling the whammy bar 260 may affect the graphical elements of the game. In FIG. 4, use of the whammy bar alters a note's "sustain trail," a visual cue that helps a player know for how long a fret button should be depressed. As shown in FIG. 4, the player is using the whammy bar to alternately increase and decrease the width of the sustain trail. Others visuals can be directly affected by the whammy bar. The graphical display of the note may widen or narrow, it may brighten or dim, pulses can be animated down the length of the note, and its overall size may grow or shrink. Any number of graphical effects may alter the note to inform the player that the whammy bar is being actively used. In some embodiments, the player might be required by the game to move the whammy bar synchronously with a pitch bend in the recorded music. The player's moving of the whammy bar does not affect the sound, but the player's ability to bend the whammy bar as directed by the game affects the player's game score.

In other embodiments, use of the whammy bar may alter both the visual and auditory aspects of the game. For example, referring to FIG. 4, use of the whammy bar may cause the pitch of the sustained note to increase and decrease while the displayed sustain trail is widened and narrowed. In another embodiment, use of the whammy bar distorts a sustained note and causes a player's avatar to execute a flamboyant move, such as a jump, striking a pose with the guitar, or "machine gunning" the crowd with the guitar.

Figure 5:
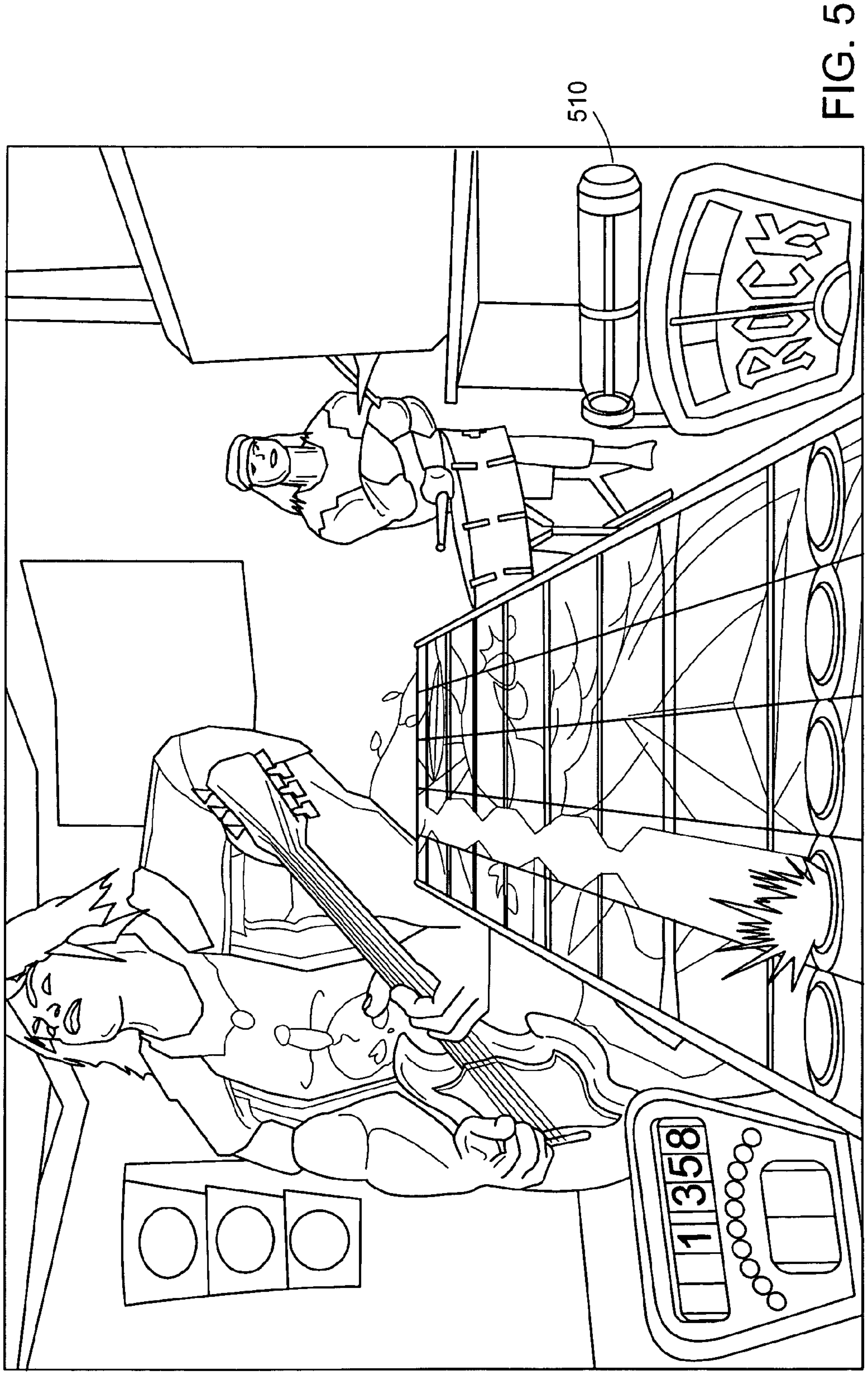
FIG. 5 is a screen shot depicting another embodiment of a screen display in which a player affects gameplay using a guitar controller having a whammy bar.

FIG. 5 depicts an embodiment of a screen display showing how use of the whammy bar may be used as a gameplay mechanic. In the screenshot shown if FIG. 5, the player is using the whammy bar to alter the pitch of a performed note. As shown in FIG. 5, the altered note is a special note indicating that the player will receive a bonus for successfully performing the note. By altering the note's pitch using the whammy bar, the player builds up the bonus more quickly. In one specific embodiment, the bonus is referred to as "star power collection" and is graphically indicated by the "star meter" 510.

In other embodiments, manipulating the whammy bar can affect other aspects of gameplay, such as the excitement of the simulated crowd, the number of points the player receives, the amount of "health" a player has, or, in general, the amount of any arbitrary game resource, such as points, score, health, money.

In some embodiments, the controller 200 may be used in conjunction with effects pedals that allow a player to activate certain audio effects. For example, a controller 200 may be provided with a socket for receiving input indicating activation of a flange pedal, fuzzbox, vocoder, distortion pedal, echo pedal, reverb pedal, chorus pedal, delay pedal, pedals that affect the attack and decay of a reproduced note and any other pedal typically used with real guitars.

The tilt sensor of controller 200 may be used as part of a gameplay mechanic. In one specific embodiment, tilting the guitar vertically causes "star power deployment" and is indicated by scoring, graphical, and sonic changes in the game. For example, tilting the guitar vertically changes the excitement of the simulated crowd, the number of points a player receives, the rate at which a player accumulates points, the overall reverberation of the music, the sound quality of the guitar notes, and other graphical and audio effects.

Although described in the context of a rhythm action game, the simulated guitar controller 200 may be used with any genre of game, including first-person shooter, survival horror, action adventure, fighting games, role playing games, real-time strategy games, platformers, puzzle games, racing games, sports games, and stealth action games, third-person shooters. The simulated guitar controller 200 may also be used with rhythm action games that do not center on performance of a musical work using an instrument, such as Dance Dance Revolution of Karaoke Revolution, both published by Konami.

Having described certain embodiments of the invention, it will now become apparent to one of skill in the art that other embodiments incorporating the concepts of the invention may be used. Although the described embodiments relate to the field of rhythm-action games, the principles of the invention can extend to other areas that involve musical collaboration or competition by two or more users connected to a network. Therefore, the invention should not be limited to certain embodiments, but rather should be limited only by the spirit and scope of the following claims.

What is claimed is:

1. A system for providing realistic interaction to a player of a music-based video game comprising:

a display;

a game controller simulating a guitar, the game controller having a strum bar and a plurality of fret buttons; and the music-based video game executing on a gaming platform in communication the display and game controller, wherein:

(a) the music-based video game is configured to present via the display, a first target musical data associated with a musical composition;

(b) the music-based video game is further configured to receive, via the game controller, a first music performance input comprising activation of a first one of a plurality of fret buttons and a strum bar on the game controller;

(c) the music-based video game is further configured to present, via the display, a second target musical data associated with the musical composition, the second target musical data visually indicating that the musical event represented by the second target musical data is amenable to a hammer-on technique; and (d) the music-based video game is further configured to receive, via the game controller, a second music performance input consisting essentially of activation of a second one of a plurality of fret buttons.

2. The system of claim 1 wherein the first target musical data, when presented via the display, is disposed along a musical time axis that does not lie in the image plane of the display associated with the player.

3. The system of claim 1 wherein the second target musical data, when presented via the display, is disposed along a musical time axis that does not lie in the image plane of the display associated with the player.

4. The system of claim 1 wherein the second target musical data has a visual appearance different from that of the first target musical data.

5. The system of claim 4 wherein the second target musical data comprises a shape different from that of the first target musical data.

6. The system of claim 4 wherein the second target musical data has a different color from that of the first target musical data.

7. The system of claim 1 wherein the music-based video game is further configured to reproduce a portion of the musical composition in response to the received second music performance input.

8. The system of claim 1 wherein the music-based video game is further configured to alter a characteristic of the music-based video game in response to the received second music performance input.

9. The system of claim 8 wherein altering the characteristic comprises altering a gameplay characteristic of the music-based video game in response to the second musical performance input.

10. The system of claim 9 wherein the altered gameplay characteristic is selected from the group consisting of score bonus, star power, player score, character health, character money, in-game power-ups, and crowd excitement.

11. The system of claim 1 wherein the music-based video game is further configured to present, via the display, third target musical data associated with the musical composition.

12. The system of claim 11 wherein the music-based video game is further configured to receive third music performance input consisting essentially of activation of one of the plurality of fret buttons.

13. The system of claim 11 wherein the music-based video game is further configured to receive third music performance input consisting essentially of activation of the first one of the plurality of fret buttons.

14. The system of claim 11 wherein the music-based video game is further configured to receive third music performance input consisting essentially of deactivation of one of the plurality of fret buttons.

15. A system for providing realistic interaction to a player of a music-based video game comprising:

a display;

a game controller simulating a guitar, the game controller having a strum bar and a plurality of fret buttons; and the music-based video game executing on a gaming platform in communication the display and game controller, wherein:

(a) the music-based video game is configured to present, via the display, a first target musical data associated with a musical composition;

(b) the music-based video game is further configured to receive, via the game controller, a first music performance input comprising activation of a first one of a plurality of fret buttons and a strum bar on the game controller;

(c) the music-based video game is further configured to present, via the display, a second target musical data associated with the musical composition, the second target musical data visually indicating that the musical event represented by the second target musical data is amenable to a pull-off technique; and (d) the music-based video game is further configured to receive, via the game controller, a second music performance input consisting essentially of deactivation of a second one of a plurality of fret buttons.

16. The system of claim 15 wherein the first target musical data is disposed along a musical time axis that does not lie in the image plane of a display associated with the player.

17. The system of claim 15 wherein the second target musical data is disposed along a musical time axis that does not lie in the image plane of a display associated with the player.

18. The system of claim 15 wherein the second target musical data has a visual appearance different from that of the first target musical data.

19. The system of claim 18 wherein the second target musical data comprises a shape different from that of the first target musical data.

20. The system of claim 18 wherein the second target musical data has color different from that of the first target musical data.

21. The system of claim 15 including further instructions being operable to cause the gaming platform to reproduce a portion of the musical composition in response to the received second music performance input.

22. The system of claim 15 including further instructions being operable to cause the gaming platform to alter a characteristic of the music-based video game in response to the received second music performance input.

23. The system of claim 22 wherein altering comprises altering a gameplay characteristic of the music-based video game in response to the second musical performance input.

24. The system of claim 23 wherein the altered gameplay characteristic is selected from the group consisting of score bonus, star power, player score, character health, character money, in-game power-ups, and crowd excitement.

25. The system of claim 15 including further instructions being operable to cause the gaming platform to present, via the display, third target musical data associated with the musical composition.

26. The system of claim 25 including further instructions being operable to cause the gaming platform to receive third music performance input consisting essentially of deactivation of another of the plurality of fret buttons.

27. The system of claim 25 including further instructions being operable to cause the gaming platform to receive third music performance input consisting essentially of activation of a fret button.

28. A music-based video game computer program product, tangibly embodied in a computer-readable storage medium, for providing realistic interaction to a player of the music-based video game using a game controller simulating a guitar and having a strum bar and a plurality of fret buttons, the computer program product including instructions operable to cause a gaming platform to:

(a) present, via a display, a first target musical data associated with a musical composition;

(b) receive a first music performance input comprising activation of a plurality of fret buttons and activation of a strum bar;

(c) present, via the display, a second target musical data associated with the musical composition, the second target musical data visually indicating that the musical event represented by the second target musical data is amenable to a hammer-on technique;

(d) receive a second music performance input consisting essentially of activation of a second one of a plurality of fret buttons.

29. The computer program product of claim 28 wherein the first target musical data is disposed along a musical time axis that does not lie in the image plane of a display associated with the player.

30. The computer program product of claim 28 wherein the second target musical data is disposed along a musical time axis that does not lie in the image plane of a display associated with the player.

31. The computer program product of claim 28 wherein the second target musical data has a visual appearance different from that of the first target musical data.

32. The computer program product of claim 31 wherein the second target musical data comprises a shape different from that of the first target musical data.

33. The computer program product of claim 31 wherein the second target musical data has color different from that of the first target musical data.

34. The computer program product of claim 28 including further instructions being operable to cause the gaming platform to reproduce a portion of the musical composition in response to the received second music performance input.

35. The computer program product of claim 28 including further instructions being operable to cause the gaming platform to alter a characteristic of the music-based video game in response to the received second music performance input.

36. The computer program product of claim 35 wherein altering comprises altering a gameplay characteristic of the music-based video game in response to the second musical performance input.

37. The computer program product of claim 36 wherein the altered gameplay characteristic is selected from the group consisting of score bonus, star power, player score, character health, character money, in-game power-ups, and crowd excitement.

38. The computer program product of claim 28 including further instructions being operable to cause the gaming platform to present, via the display, third target musical data associated with the musical composition.

39. The computer program product of claim 38 including further instructions being operable to cause the gaming platform to receive third music performance input consisting essentially of activation of one of the plurality of fret buttons.

40. The computer program product of claim 38 including further instructions being operable to cause the gaming platform to receive third music performance input consisting essentially of activation of the first one of plurality of fret buttons.

41. The computer program product of claim 38 including further instructions being operable to cause the gaming platform to receive third music performance input consisting essentially of deactivation of one of the plurality of fret buttons.

42. A music-based video game computer program product, tangibly embodied in a computer-readable storage medium, for providing realistic interaction to a player of the music-based video game using a game controller simulating a guitar and having a strum bar and a plurality of fret buttons, the computer program product including instructions operable to cause a gaming platform to:

(a) present, via a display, a first target musical data associated with a musical composition;

(b) receive a first music performance input comprising activation of a plurality of fret buttons and activation of a strum bar;

(c) present, via the display, a second target musical data associated with the musical composition, the second target musical data visually indicating that the musical event represented by the second target musical data is amenable to a pull-off technique;

(d) receive a second music performance input consisting essentially of deactivation of one of the plurality of fret buttons.

43. The computer program product of claim 42 wherein the first target musical data is disposed along a musical time axis that does not lie in the image plane of a display associated with the player.

44. The computer program product of claim 42 wherein the second target musical data is disposed along a musical time axis that does not lie in the image plane of a display associated with the player.

45. The computer program product of claim 42 wherein the second target musical data has a visual appearance different from that of the first target musical data.

46. The computer program product of claim 45 wherein the second target musical data comprises a shape different from that of the first target musical data.

47. The computer program product of claim 45 wherein the second target musical data has color different from that of the first target musical data.

48. The computer program product of claim 42 including further instructions being operable to cause the gaming platform to reproduce a portion of the musical composition in response to the received second music performance input.

49. The computer program product of claim 42 including further instructions being operable to cause the gaming platform to alter a characteristic of the music-based video game in response to the received second music performance input.

50. The computer program product of claim 49 wherein altering comprises altering a gameplay characteristic of the music-based video game in response to the second musical performance input.

51. The computer program product of claim 50 wherein the altered gameplay characteristic is selected from the group consisting of score bonus, star power, player score, character health, character money, in-game power-ups, and crowd excitement.

52. The computer program product of claim 42 including further instructions being operable to cause the gaming platform to present, via the display, third target musical data associated with the musical composition.

53. The computer program product of claim 52 including further instructions being operable to cause the gaming platform to receive third music performance input consisting essentially of deactivation of another of the plurality of fret buttons.

54. The computer program product of claim 52 including further instructions being operable to cause the gaming platform to receive third music performance input consisting essentially of activation of a fret button.

55. A system for providing realistic interaction to a player of a music-based video game comprising:

a display;

a game controller simulating a guitar, the game controller having a strum bar and a plurality of fret buttons; and the music-based video game executing on a gaming platform in communication the display and game controller, wherein:

(a) the music-based video game is configured to present, via the display, a first target gem associated with a musical composition;

(b) the music-based video game is further configured to present, via the display, a second target gem associated with the musical composition, the second target gem visually indicating that the musical event represented by the second target gem is amenable to a hammer-on technique;

(c) the music-based video game is further configured to receive, via the game controller, a first music performance input comprising activation of a first one of a plurality of fret buttons and a strum bar on the game controller; and (d) the music-based video game is further configured to receive, via the game controller, a second music performance input consisting essentially of activation of a second one of a plurality of fret buttons.

56. A system for providing realistic interaction to a player of a music-based video game comprising:

a display;

a game controller simulating a guitar, the game controller having a strum bar and a plurality of fret buttons; and the music-based video game executing on a gaming platform in communication the display and game controller, wherein:

(a) the music-based video game is configured to present, via the display, a first target gem associated with a musical composition;

(b) the music-based video game is further configured to present, via the display, a second target gem associated with the musical composition, the second target gem visually indicating that the musical event represented by the second target gem is amenable to a pull-off technique;

(c) the music-based video game is further configured to receive, via the game controller, a first music performance input comprising activation of a first one of a plurality of fret buttons and a strum bar on the game controller; and (d) the music-based video game is further configured to receive, via the game controller, a second music performance input consisting essentially of deactivation of a second one of a plurality of fret buttons.

57. A music-based video game computer program product, tangibly embodied in a computer-readable storage medium, for providing realistic interaction to a player of the music-based video game using a game controller simulating a guitar and having a strum bar and a plurality of fret buttons, the computer program product including instructions operable to cause a gaming platform to:

(a) present, via a display, a first target gem associated with a musical composition;

(b) present, via the display, a second target gem associated with the musical composition, the second target gem visually indicating that the musical event represented by the second target gem is amenable to a hammer-on technique;

(c) receive a first music performance input comprising activation of a plurality of fret buttons and activation of a strum bar; and (d) receive a second music performance input consisting essentially of activation of a second one of a plurality of fret buttons.

58. A music-based video game computer program product, tangibly embodied in a computer-readable storage medium, for providing realistic interaction to a player of the music-based video game using a game controller simulating a guitar and having a strum bar and a plurality of fret buttons, the computer program product including instructions operable to cause a gaming platform to:

(a) present, via a display, a first target gem associated with a musical composition;

(b) present, via the display, a second target gem associated with the musical composition, the second target gem visually indicating that the musical event represented by the second target gem is amenable to a pull-off technique;

(c) receive a first music performance input comprising activation of a plurality of fret buttons and activation of a strum bar; and (d) receive a second music performance input consisting essentially of deactivation of one of the plurality of fret buttons.

* * * * *